US012647640B2

(12) United States Patent
Kitazato et al.

(10) Patent No.: US 12,647,640 B2
(45) Date of Patent: Jun. 2, 2026

(54) INFORMATION PROCESSING APPARATUS, INFORMATION PROCESSING METHOD, AND PROGRAM

(71) Applicant: Sony Group Corporation, Tokyo (JP)

(72) Inventors: Naohisa Kitazato, Tokyo (JP);
Yoshiharu Dewa, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/307,400

(22) Filed: May 4, 2021

(65) Prior Publication Data

US 2021/0258631 A1 Aug. 19, 2021

Related U.S. Application Data

(63) Continuation of application No. 15/067,389, filed on Mar. 11, 2016, now abandoned, which is a
(Continued)

(30) Foreign Application Priority Data

Dec. 2, 2011 (JP) ................................. 2011-264744

(51) Int. Cl.
*H04H 20/24* (2008.01)
*H04H 20/16* (2008.01)
(Continued)

(52) U.S. Cl.
CPC ........ *H04N 21/4349* (2013.01); *H04H 20/24* (2013.01); *H04H 20/26* (2013.01);
(Continued)

(58) Field of Classification Search
CPC .............. H04N 21/4858; H04N 7/163; H04N 21/25816; H04N 21/25825; H04N 21/431;
(Continued)

(56) References Cited

U.S. PATENT DOCUMENTS 6,230,321 B1 * 5/2001 Kim ..................... H04N 21/426
715/788
7,216,170 B2 * 5/2007 Ludvig .............. H04N 21/2362
725/100
(Continued)

FOREIGN PATENT DOCUMENTS

EP 2320650 A1 5/2011
EP 2712190 A1 3/2014
(Continued)

OTHER PUBLICATIONS

Hybrid Broadcast Broadband TV, ETSI TS 102 796, V1.1.1, Jun. 2010, 75 pages. (Year: 2010).*
(Continued)

*Primary Examiner* — Alfonso Castro
(74) *Attorney, Agent, or Firm* — Lerner David LLP

(57) ABSTRACT

[Object] To enable a user to conveniently use broadcast of a data program that the user wishes to view under an environment where data broadcast and Internet-related broadcast coexist.

[Solving means] There is provided an information processing apparatus that acquires a startup document of data broadcast including instruction information that instructs to acquire an application information table related to an application for presenting a data program related to a television program, acquires the application information table based on the instruction information stored in the startup document, acquires the application based on the application information table, and executes the application to present the data program.

18 Claims, 20 Drawing Sheets

Related U.S. Application Data continuation of application No. 14/359,153, filed as application No. PCT/JP2012/007160 on Nov. 8, 2012, now Pat. No. 9,313,546.

(51) Int. Cl.

| | |
|---|---|
| *H04H 20/26* | (2008.01) |
| *H04H 20/28* | (2008.01) |
| *H04H 20/93* | (2008.01) |
| *H04N 21/434* | (2011.01) |
| *H04N 21/462* | (2011.01) |
| *H04N 21/488* | (2011.01) |
| *H04N 21/61* | (2011.01) |
| *H04N 21/81* | (2011.01) |
| *H04N 21/8547* | (2011.01) |

(52) U.S. Cl.
CPC ........ *H04H 20/93* (2013.01); *H04N 21/4345* (2013.01); *H04N 21/462* (2013.01); *H04N 21/4622* (2013.01); *H04N 21/488* (2013.01); *H04N 21/6125* (2013.01); *H04N 21/8173* (2013.01); *H04N 21/8547* (2013.01); *H04H 20/16* (2013.01); *H04H 20/28* (2013.01)

(58) Field of Classification Search
CPC ........... H04N 21/6543; H04N 21/6547; H04N 21/8173; H04N 21/858; H04H 60/13; G06F 9/445
USPC .......................................................... 725/25
See application file for complete search history.

(56) References Cited

U.S. PATENT DOCUMENTS

| | | | |
|---|---|---|---|
| 7,461,528 | B2 | 12/2008 | Taniguchi et al. |
| 8,463,104 | B2 | 6/2013 | Iwakiri et al. |
| 2003/0217369 | A1* | 11/2003 | Heredia ................. H04N 7/162 348/E7.071 |
| 2005/0283800 | A1* | 12/2005 | Ellis ....................... H04N 21/47 348/E5.122 |
| 2006/0117370 | A1* | 6/2006 | Kitazato ............ H04N 21/6377 375/E7.017 |
| 2009/0313663 | A1 | 12/2009 | Kitazato et al. |
| 2011/0016171 | A1* | 1/2011 | Kim ................... H04N 21/8586 709/203 |
| 2011/0083074 | A1* | 4/2011 | Jellison, Jr. .......... G06F 3/0489 715/727 |
| 2011/0182562 | A1* | 7/2011 | Iwakiri ............. H04N 21/4882 386/248 |
| 2011/0213681 | A1* | 9/2011 | Shahid ................... H04W 4/20 370/259 |
| 2011/0247031 | A1 | 10/2011 | Jacoby |
| 2011/0292284 | A1 | 12/2011 | Lee et al. |
| 2012/0180101 | A1* | 7/2012 | Davis ................ H04N 21/6118 725/116 |
| 2012/0284749 | A1 | 11/2012 | Lee et al. |
| 2013/0051770 | A1 | 2/2013 | Sargent |
| 2013/0291050 | A1 | 10/2013 | Kim et al. |

FOREIGN PATENT DOCUMENTS

| | | |
|---|---|---|
| EP | 2775707 A1 | 9/2014 |
| JP | 2004221872 A | 8/2004 |
| JP | 2007096650 A | 4/2007 |
| JP | 2007312090 A | 11/2007 |
| JP | 2008507154 A | 3/2008 |
| JP | 2008187474 A | 8/2008 |
| JP | 2009303062 A | 12/2009 |
| JP | 2011066556 A | 3/2011 |
| JP | 2011155317 A | 8/2011 |
| WO | 2006075590 A1 | 7/2006 |
| WO | 2011008020 A2 | 1/2011 |
| WO | 2011027504 A1 | 3/2011 |

OTHER PUBLICATIONS

International Search Report from International Application No. PCT/JP2012/007160, dated Dec. 4, 2012.
ETSI (European Telecommunications Standards Institute) "ETSI TS 102 796 V1.1.1 (Jun. 2010)" http://www.etsi.org/deliver/etsi_ts/102700_102799/102796/01.01.01_60/ts_102796v010101p.pdf (browsed on Oct. 21, 2011).
Association of Radio Industries and Businesses "Application execution environment standard ARIB STD-B23 1.2 in digital broadcast" http://www.arib.or.jp/english/html/overview/doc/2-STD-B23v1_2.pdf (browsed on Oct. 21, 2011).
Japanese Office Action for JP Application No. 2014238878, dated Dec. 24, 2014.
Japanese Office Action for JP Application No. 2014238879, dated Dec. 24, 2014.
ETSI TS 102 809 V1.1.1 Digital Video Broadcasting (DVB); Signalling and carriage of interactive applications and services in Hybrid broadcast/broadband environments; Jan. 2010, pp. 1-98.
Extended European Search Report for EP Application No. 12853194.4, dated Jun. 10, 2015.
Association of Radio Industries and Businesses, ARIB Technical Report, Operational Guidelines for Digital Terrestrial Television Broadcasting, Version 2.8, May 29, 2006.
European Telecommunications Standards Institute, ETSI TS 102 809, V1.1.1, Digital Video Broadcasting.
European Telecommunications Standards Institute, ETSI TS 102 796, V1.1.1, Hybrid Broadcast Broadband TV, Jun. 2010.
Extended European Search Report for EP Application No. 16178112.5, dated Oct. 4, 2016.
Japanese Office Action for Application No. 2014-159159 dated Sep. 27, 2016.
Japanese Office Action for Application No. 2014159159, dated Mar. 28, 2017.
Extended European Search Report for EP Application No. 18175537.2, dated Jul. 17, 2018.
"Hybrid Broadcast Broadband TV", ETSI, V1, Nov. 2012, 75 pages.
"Digital Video Broadcasting (DVB); Signalling and Carriage of Interactive Applications and Services in Hybrid Broadcast/Broadband Environments", ETSI TS, 102:809, V1.1, Jan. 2010, 98 pages.
"ARIB Technical Report", Operational Guidelines for Digital Terrestrial Television Broadcasting, Association of Radio Industries and Businesses, May 2006, 589 pages.
Summons to Attend Oral Proceedings for Application No. EP16178112.5, dated Jan. 16, 2020, pp. 1-6.

* cited by examiner

INFORMATION PROCESSING APPARATUS, INFORMATION PROCESSING METHOD, AND PROGRAM

CROSS-REFERENCE TO RELATED APPLICATIONS

The present application is a continuation of U.S. application Ser. No. 15/067,389, filed Mar. 11, 2016, which is a continuation of U.S. application Ser. No. 14/359,153 (now U.S. Pat. No. 9,313,546), filed May 19, 2014, which is a national phase entry under 35 U.S.C. § 371 of International Application No. PCT/JP2012/007160 filed Nov. 8, 2012, published on Jun. 6, 2013 as WO 2013/080450 A1, which claims priority from Japanese Patent Application No. JP 2011-264744 filed in the Japanese Patent Office on Dec. 2, 2011.

TECHNICAL FIELD

The present disclosure relates to an information processing apparatus, an information processing method, and a program for selectively acquiring and using a data program by broadcast and communication.

BACKGROUND ART

In Japan, digital broadcast concomitantly uses data broadcast by a BML (Broadcast Markup Language) system. Recently, an introduction of Internet-related broadcast that provides a data program to a receiver not through broadcast waves but through the Internet to be used is being discussed. As such a technique that performs data broadcast via the Internet, a technique called hybrid broadcast broadband TV (hereinafter, referred to as "HbbTV") is known. As a standard of HbbTV, "ETSI TS 102 796" (see Non-patent Literature 1) has been developed in Europe. Further, the standard "ARIB STD-B23" (see Non-patent Literature 2) conforming thereto has been developed also in our country.

CITATION LIST

Non Patent Literature

[Non Patent Literature 1] ETSI (European Telecommunications Standards Institute) "ETSI TS 102 796 V1.1.1 (2010-06)"
http://www.etsi.org/deliver/etsi_ts/102700_102799/102796/01.01.01_60/ts_102796v010101p.pdf (browsed on Oct. 21, 2011)
[Non Patent Literature 2] Association of Radio Industries and Businesses "Application execution environment standard ARIB STD-B23 1.2 in digital broadcast"
http://www.arib.or.jp/english/html/overview/doc/2-STD-B23v1_2.pdf (browsed on Oct. 21, 2011)

SUMMARY OF INVENTION

Problem to be Solved by the Invention

While data broadcast has an advantage that an application can be provided to a receiver that does not have an Internet connection environment, Internet-related broadcast has a different advantage that a relatively-high-degree function that uses bidirectional communication with a receiver can be realized. Therefore, it is expected that the data broadcast and Internet-related broadcast will coexist in the future.

Under the environment where the data broadcast and Internet-related broadcast coexist, there is desired a mechanism that enables a user to conveniently use the data broadcast and Internet-related broadcast in a receiver.

In view of the circumstances as described above, an object of the present disclosure is to provide an information processing apparatus, an information processing method, and a program that enable a user to conveniently select broadcast of a data program that the user wishes to view under an environment where data broadcast and Internet-related broadcast coexist.

Means for Solving the Problem

For solving the problem above, according to the present disclosure, there is provided an information processing apparatus including a controller that acquires a multimedia document of data broadcast including instruction information that instructs to acquire application control information related to an application for presenting a data program related to a television program, acquires the application control information based on the instruction information stored in the acquired multimedia document, acquires the application based on the application control information, and executes the application to present the data program.

The controller may end, along with a switch of the multimedia document of the data broadcast accompanied by an update of the multimedia document while the data program is being presented based on the application, the execution of the application and acquire the switched multimedia document.

The controller may acquire, while a second data program is being presented by the data broadcast, the switched multimedia document according to the switch of the multimedia document of the data broadcast accompanied by the update of the multimedia document.

The controller may acquire, upon receiving an instruction from a user, the application control information via the Internet based on the instruction information stored in the multimedia document.

The controller may acquire, upon receiving an instruction from a user, the application control information via the broadcast waves based on the instruction information stored in the multimedia document.

The controller may acquire the switched multimedia document upon detecting that a pullback flag of a DII (Download Info Indication) message has been set.

The controller may acquire the switched multimedia document upon detecting a switch of a data event.

The controller may acquire the switched multimedia document upon receiving an event message including a specific event message ID.

The controller may calculate a time up to an end of the execution of the application, start a timer count as well as set the calculation result as a timer setting value, and acquire the switched multimedia document when a value of the timer count reaches the timer setting value.

According to the present disclosure, there is provided an information processing method including: acquiring, by a controller, a multimedia document of data broadcast including instruction information that instructs to acquire application control information related to an application for presenting a data program related to a television program; acquiring, by the controller, the application control information based on the instruction information stored in the multimedia document; acquiring, by the controller, the application based on the application control information; and executing, by the controller, the application to present the data program.

According to the present disclosure, there is provided a program that causes a computer to function as a controller that acquires a multimedia document of data broadcast including instruction information that instructs to acquire application control information related to an application for presenting a data program related to a television program, acquires the application control information based on the instruction information stored in the multimedia document, acquires the application based on the application control information, and executes the application to present the data program.

Effect of the Invention

As described above, according to the present disclosure, a user can conveniently select broadcast of a data program that the user wishes to view under an environment where data broadcast and Internet-related broadcast coexist.

MODES FOR CARRYING OUT THE INVENTION

Hereinafter, embodiments of the present disclosure will be described with reference to the drawings.

First Embodiment

[Information Processing System]

Figure 1:
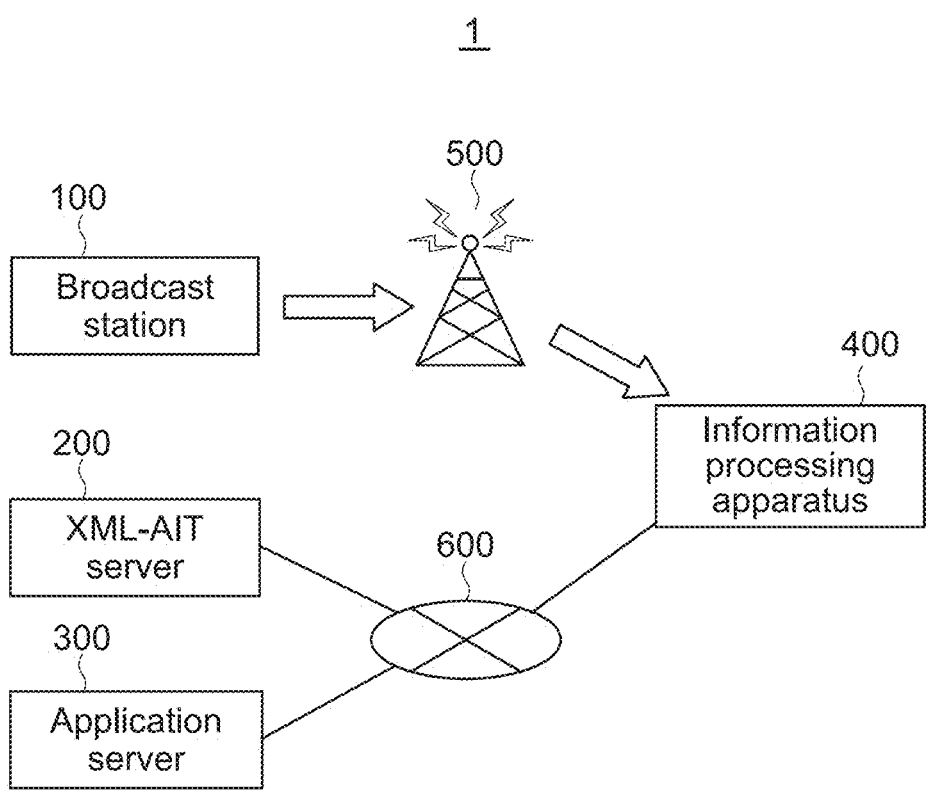
FIG. 1 A diagram showing a general outline of an information processing system according to a first embodiment of the present disclosure.

FIG. 1 is a diagram showing a general outline of an information processing system according to a first embodiment of the present disclosure.

The information processing system 1 of this embodiment includes a broadcast station 100, an XML-AIT server 200, an application server 300, and an information processing apparatus 400 as a receiver.

The broadcast station 100 multiplexes a real-time stream of a TV program, a data carousel of a data program, an event message, and the like and transmits them as digital broadcast signals via a broadcast wave transmission medium 500 such as terrestrial, and satellite, IP (Internet Protocol) networks.

The XML-AIT server 200 stores a file of an XML (Extensible Markup Language)-AIT describing information for managing an Internet-related broadcast application. The Internet-related broadcast application is a program created in a markup language for supporting a multimedia content, such as HTML 5. In response to an acquisition request from the information processing apparatus 400, the XML-AIT server 200 transmits a relevant XML-AIT file to the information processing apparatus 400 via a network transmission medium 600.

The application server 300 stores an Internet-related broadcast application. In response to an acquisition request from the information processing apparatus 400, the application server 300 transmits a relevant application file to the information processing apparatus 400 via the network transmission medium 600.

The information processing apparatus 400 is, for example, a personal computer, a cellular phone, a smartphone, a television apparatus, or a game device, though a product form thereof is not specifically limited.

The information processing apparatus 400 is capable of receiving and demodulating a digital broadcast signal from the broadcast station 100 to restore a transport stream of a real-time stream of a TV program. The information processing apparatus 400 is capable of separating video data and audio data constituting the real-time stream of a TV program from the transport stream, decoding them, and outputting them to a display unit (not shown) or speaker unit (not shown) connected to the information processing apparatus 400 or a recording apparatus (not shown).

It should be noted that the display unit, the speaker unit, and the recording apparatus may be integrated with the information processing apparatus 400, or they may be directly connected to the information processing apparatus 400 or indirectly connected thereto via a local area network (not shown) as independent apparatuses. Alternatively, an apparatus (not shown) including the display unit and the speaker unit may be directly connected to the information processing apparatus 400 or indirectly connected thereto via the local area network (not shown).

The information processing apparatus 400 separates a BML content of a data carousel system, an event message, and the like from the acquired transport stream. The information processing apparatus 400 is capable of decoding the separated BML content by a data broadcast browser, converting it into an image, superimposing it on the video data of the TV program, and outputting it to the display unit (not shown). The information processing apparatus 400 is also capable of occasionally causing a switch of a content of the content based on the separated event message.

The information processing apparatus 400 is also capable of acquiring, via the network transmission medium 600, a file of an XML-AIT and an application to be managed based on the XML-AIT from the application server 300. The information processing apparatus 400 is also capable of interpreting the acquired XML-AIT and controlling an acquisition of an application from the application server 300 and a life cycle of the acquired application such as an activation and an end.

[Data Broadcast]

In Japan, DSMCC (ISO 138 18-6) is adopted as a section format in the data broadcast, and a data carousel system and an event message system are adopted.

(Data Carousel System)

Figure 3:
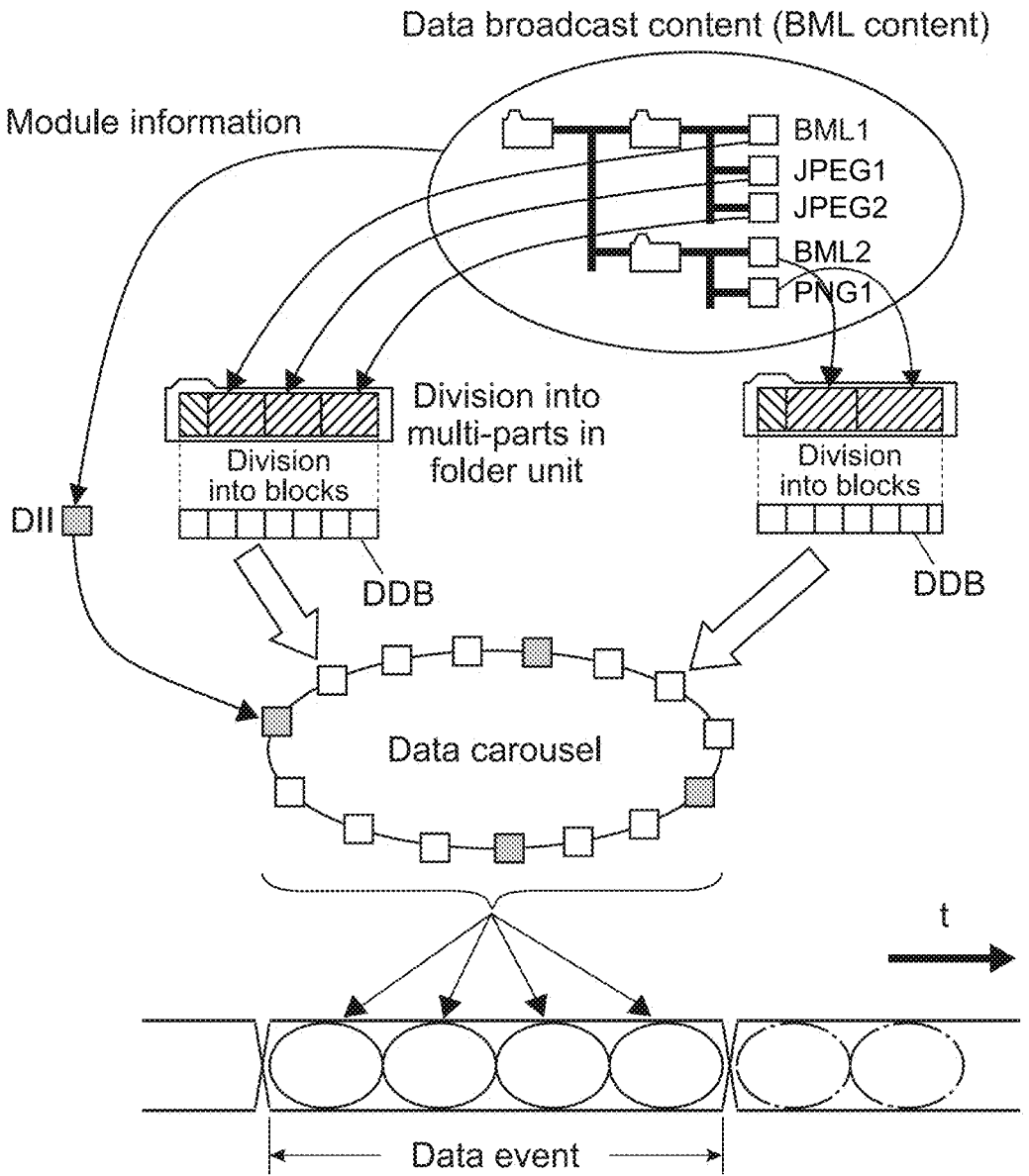
FIG. 3 A schematic diagram of a data carousel system.

FIG. 3 is a schematic diagram of the data carousel system.

In the data carousel system, a content of a data program (BML document etc.) is constituted of a plurality of resources. A plurality of resource files are organized as modules in a multi-part format. The modules are each divided into blocks in a message length of 4072 bytes at maximum, which are called DDB (Download Data Block) messages. The DDB messages are changed into a DSMCC section for a carousel transmission defined by ISO/IEC 13818-6, divided into TS packets, and repetitively transmitted during a period called data event.

In dividing the module into DDB messages, DII (Download Info Indication) message for transmitting information of each module is into a DSMCC section at the same time, divided into TS packets, and repetitively transmitted during the data event period. The DII message is a message for notifying the information processing apparatus 400 what kind of module each module is.

The data event is switched according to an update of a data event ID of the DII message transmitted by a component. In other words, in sync with an update of the data event ID, a local content as a content transmitted during the data event is switched.

Figure 4:
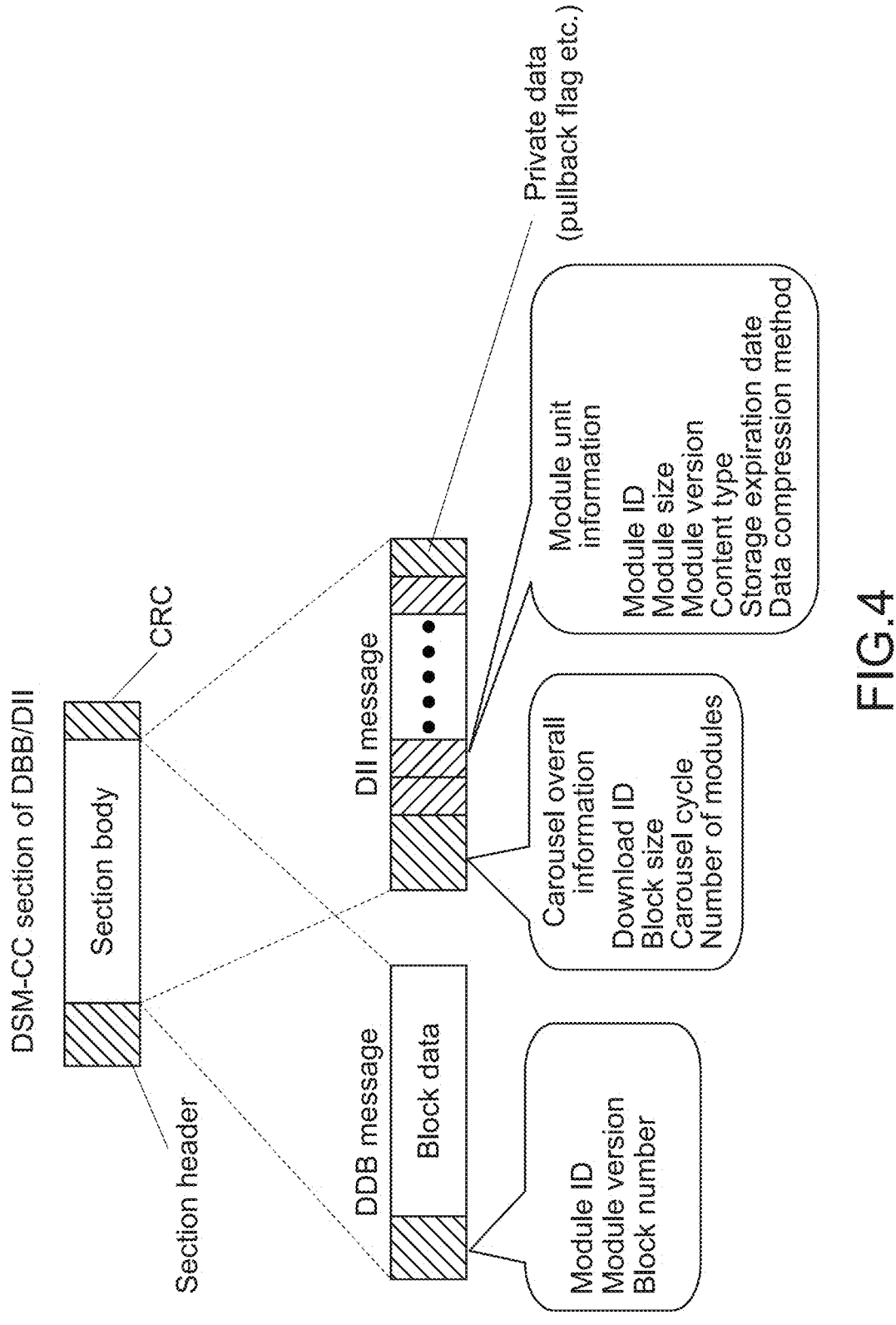
FIG. 4 A diagram showing a structure of a DSMCC section.

As shown in FIG. 4, the DSMCC section is constituted of a section header, a section body, and a CRC. The section body stores a DDB message or a DII message.

The DII message is constituted of carousel overall information, module unit information, and private information.

The carousel overall information includes information on a download ID, a block size, a carousel cycle, the number of modules, and the like.

The download ID is label information for uniquely identifying a data carousel. The download ID includes a data event ID for identifying a data event.

The block size represents a byte length of each block of the data transmitted in the DDB message other than a module tail.

The carousel cycle indicates a cycle of a module that has a longest transmission cycle out of the modules constituting a data carousel.

The number of modules indicates the number of modules to be transmitted in a single data carousel.

The module unit information includes, as information of each module, a module ID, a module length, and a module version.

The module ID is identification information of a module.

The module length is a byte length of a module.

The module version is a version of a module.

As other information, there are a module expiration date, a data compression method, a content type, and the like.

Figure 5:
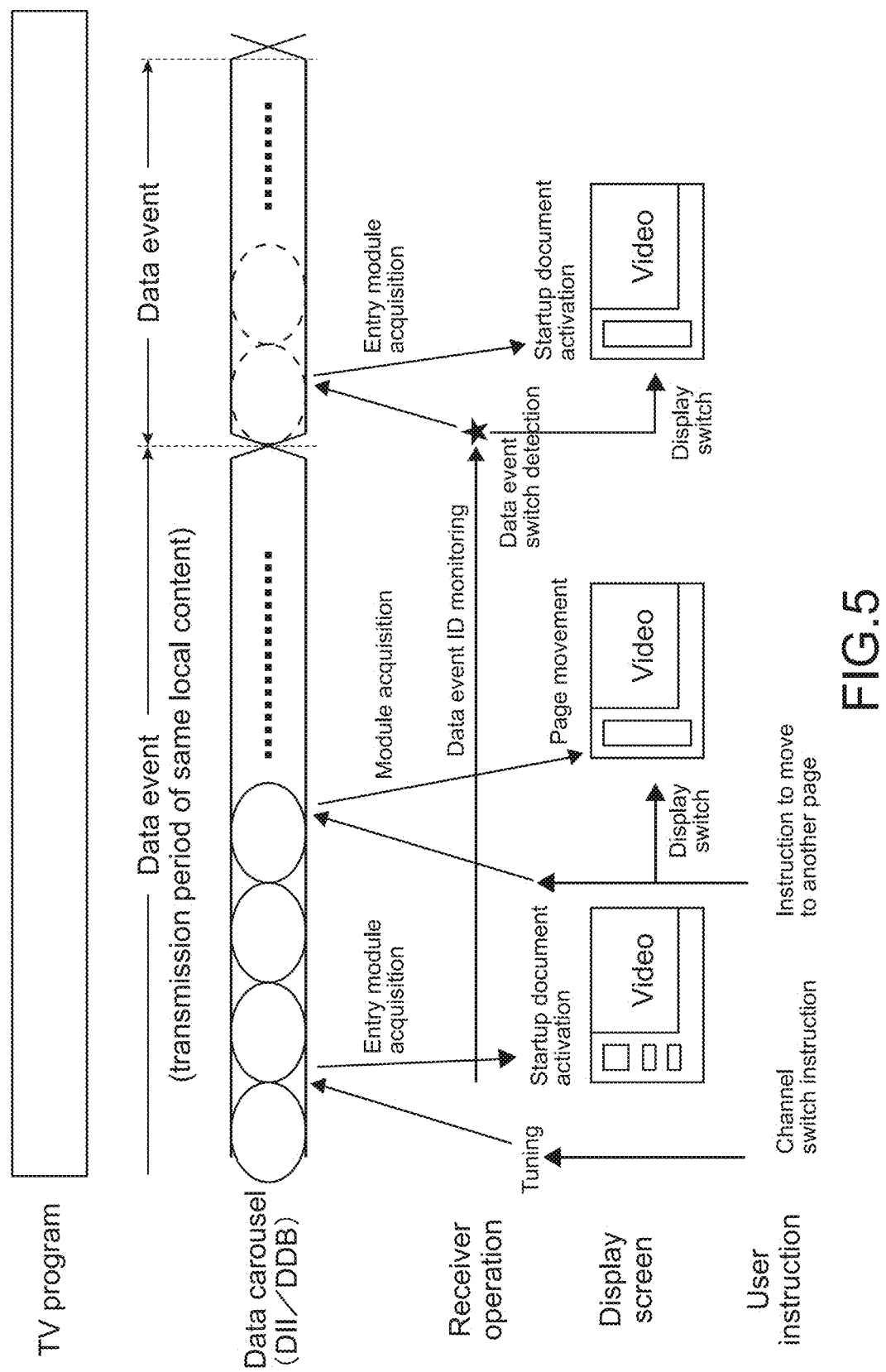
FIG. 5 A diagram showing a data event reception sequence.

FIG. 5 is a diagram showing a data event reception sequence.

As a channel switch instruction is input by a user while a data carousel is being received in the information processing apparatus 400, the information processing apparatus 400 acquires, from an entry component that transmits a startup document as an entry to a BML content, an entry module including the startup document. The information processing apparatus 400 activates the acquired startup document. As a result, a startup screen is presented on a screen of the display unit connected to the information processing apparatus 400 in addition to a TV program. In the startup screen, various buttons for switching presentment to various types of low-order pages are provided. When a button that instructs to move to an arbitrary low-order page is operated by the user, the information processing apparatus 400 acquires a module of the BML content of the low-order page from the entry component and updates the screen of the data broadcast program.

On the other hand, the information processing apparatus 400 constantly monitors the data event ID of the DII message. Upon detecting that the data event ID has been updated, the information processing apparatus 400 again acquires an entry module including a startup document from the entry component and activates it to thus make a switch to the startup screen.

(Pullback Flag)

As shown in FIG. 4, a pullback flag can be described in the DII message as the private information.

Figure 6:
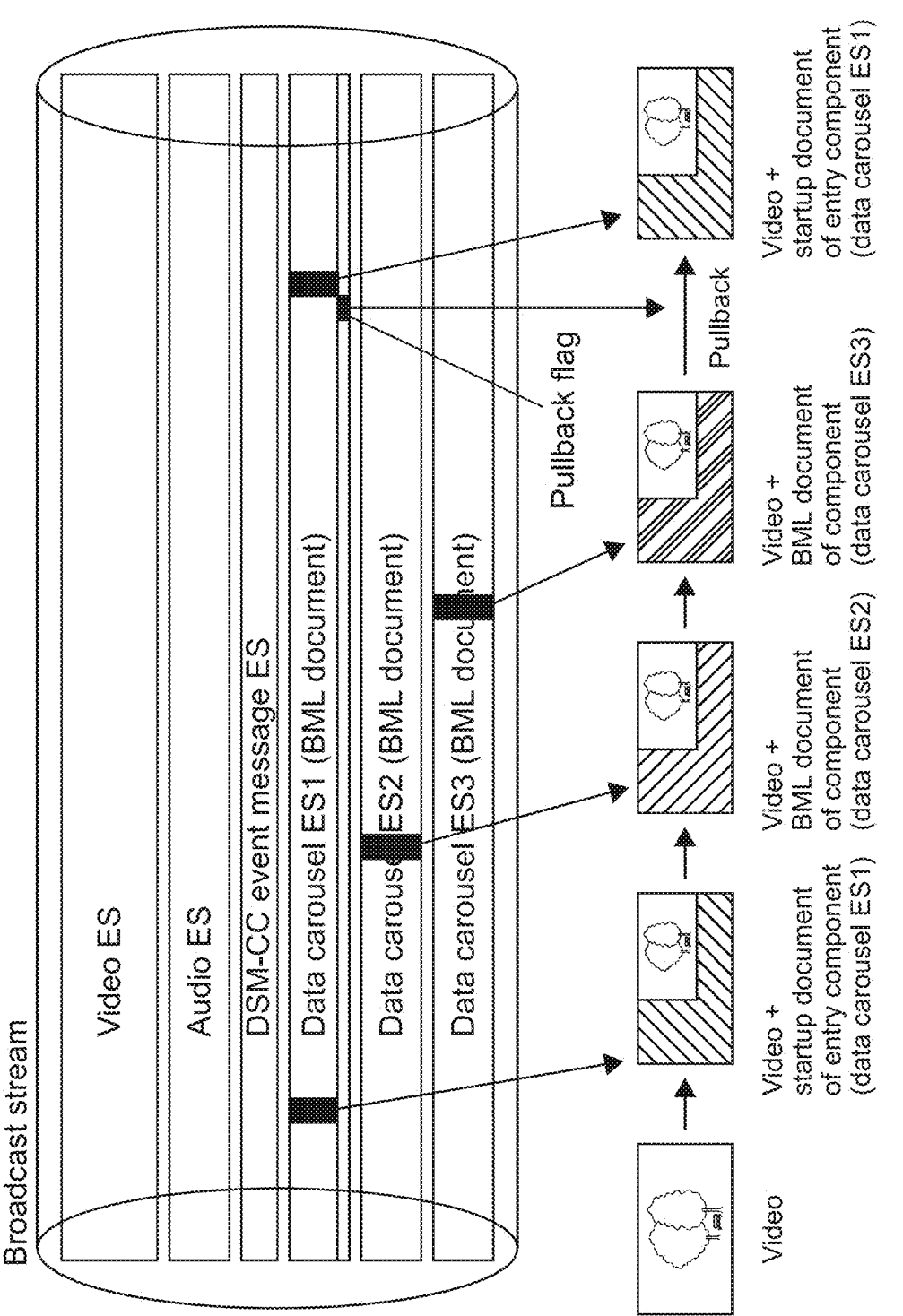
FIG. 6 An explanatory diagram of an original pullback flag usage method.

FIG. 6 is an explanatory diagram of an original pullback flag usage method.

A data broadcast component that is activated first in the information processing apparatus 400 in a case where a plurality of data broadcast components are transmitted at the same time is called entry component. There is a case where control is to be forcibly shifted to a BML content of a startup document of an entry component and the like in sync with a switch of the BML content of the entry component regardless of a content of the BML content being presented. In such a case, a pullback flag is set in the private information area of the DII message of the entry component. Regardless of which BML content of a component is being presented, the information processing apparatus 400 forcibly shifts the control to the startup document of the entry component as long as a pullback flag is set in the DII message of the entry component. It should be noted that the pullback flag can be set in only the DII message of the entry component.

Heretofore, the standard usage method of a pullback flag has been described. This embodiment uses the pullback flag as a trigger for processing for prompting the user to present an Internet-related broadcast program.

(Event Message System)

In the event message system, with respect to a multimedia content presented in the information processing apparatus, an interrupt event is caused asynchronously or by designating a time, and an event message is transmitted from the broadcast station the information processing apparatus in real time for the purpose of transmitting data accompanying the event at the same time. The event message is transmitted singly instead of repetitively like the data carousel by an event message-dedicated component. Therefore, the message can be transmitted at a higher speed (more in real time) than the data carousel to be used for a transmission of a trigger that requires a temporal synchronization.

Figure 7:
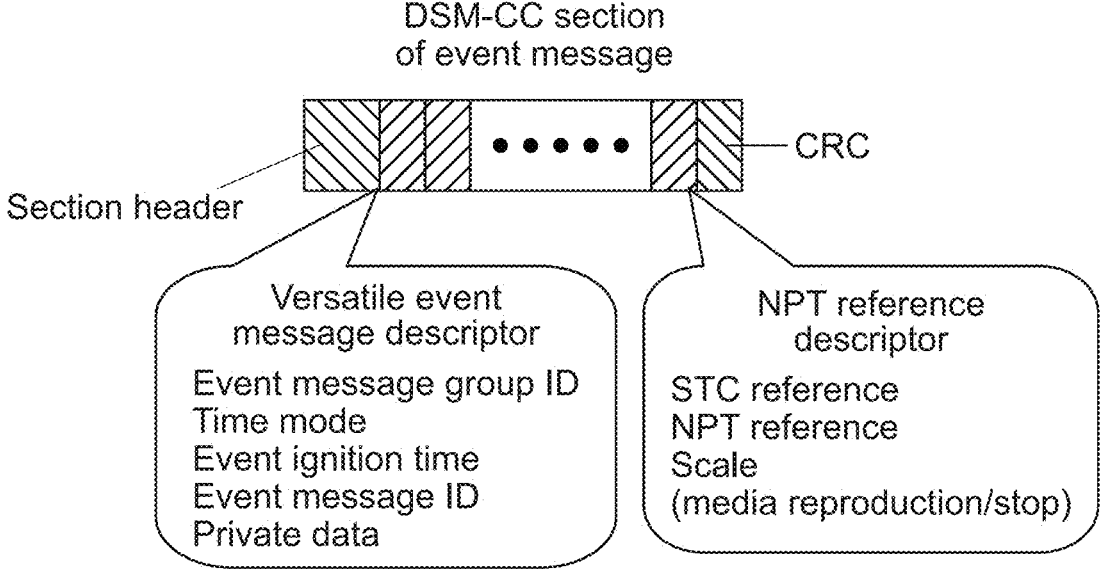
FIG. 7 A diagram showing a structure of an event message.

As shown in FIG. 7, the event message includes a versatile event message describing a data content and synchronization information of an event message and an NPT reference descriptor.

The versatile event message includes an event message group ID, a time mode, an event ignition time, an event message ID, and private data.

The event message group ID is an identifier for identifying a message group that an application that the receiver is operating for presenting a multimedia content is to receive.

The time mode indicates a method of designating a time at which an event message occurs.

The event ignition time indicates a time at which an event message occurs in Japan Standard Time (JST) and modified Julian date (MJD).

The event message ID is an identifier for identifying an individual event message.

The private data is event message-related information.

The NPT reference descriptor includes a descriptor for transmitting a relationship between an NPT (Normal Play Time) and an STC (System Time Clock).

[Internet-Related Broadcast]

In the Internet-related broadcast, by the information processing apparatus acquiring, in sync with display of a TV program, an application related to or unrelated to the TV program from the application server and executing it, a screen of the application is presented as a window superimposed on a video of the TV program.

In the Internet-related broadcast, application control information (Application Information Table, hereinafter, referred to as "AIT") as a data structure for managing a life cycle of an application is used.

As control codes related to the life cycle of an application, there are, for example, "AUTOSTART", "PRESENT", "DESTROY", and "KILL". "AUTOSTART" is information that instructs to immediately activate an application. "PRESENT" is information that instructs to receive an application by a reception apparatus (information processing apparatus) without automatically executing it. "DESTROY" is information that instructs to stop an application. "KILL" is a code that instructs to forcibly end an application.

Based on the control code described in the AIT, the information processing apparatus acquires and activates an application designated to be activated immediately, or stops or forcibly ends an application designated to be ended, for example.

As methods of transmitting an AIT, there are the following methods.

1. Method of transmitting by digital broadcast signals
2. Method of arranging a file of an XML-AIT whose data structure, that is the same as that of the AIT, is described in an XML (Extensible Markup Language) in a server, and acquiring the file of the XML-AIT by the information processing apparatus accessing the server.

In the 2 methods above, location information of the XML-AIT file is transmitted to the information processing apparatus by digital broadcast signals, for example. The information processing apparatus accesses the server based on the acquired location information and acquires the XML-AIT file. The information processing apparatus accesses the application server based on the location information of the application described in the XML-AIT and acquires the application.

[Switch from Data Broadcast to Internet-Related Broadcast]

Heretofore, the data broadcast and Internet-related broadcast have been described. When assuming an environment where the two broadcast coexist as data programs related to a TV program, there is desired a mechanism that enables a user to conveniently select broadcast of a data program that the user wishes to view in the information processing apparatus.

In this embodiment, the mechanism described above is mainly realized by the following means.

1. The broadcast station 100 transmits a startup document corresponding to a switch to the Internet-related broadcast by an entry component. The startup document corresponding to the switch to the Internet-related broadcast stores, as instruction information that instructs to acquire application control information (AIT/XML-AIT) related to an application for presenting a data program related to a TV program, a script for causing the information processing apparatus 400 to acquire a file of the XML-AIT managing a life cycle of the Internet-related broadcast application.

2. A controller of the information processing apparatus 400 (CPU 401 shown in FIG. 2) checks, upon receiving a startup document corresponding to the switch to the Internet-related broadcast, whether a connection to the Internet is possible.

3. When the connection to the Internet is possible, the controller of the information processing apparatus 400 displays a button capable of accepting an instruction to present the Internet-related broadcast program from the user (I button) on the screen of the display unit.

4. When the I button is operated by the user, the controller of the information processing apparatus 400 executes the script as the instruction information stored in the startup document and acquires the XML-AIT file from the XML-AIT server.

5. The controller of the information processing apparatus 400 acquires the application from the application server based on the acquired XML-AIT and executes it to present the Internet-related broadcast program in place of the data broadcast program.

6. When a d button of a remote controller is operated by the user while the I button is being displayed, the controller of the information processing apparatus 400 deletes the I button, advances to a low-order page of the BML content, and maintains the presentment state of the data broadcast program.

7. Even when either the data broadcast program or the Internet-related broadcast program is presented, a startup document is acquired along with a switch of the startup document of the entry component, and the processing advances to the processing of 1 above. Specifically, upon detecting that a pullback flag of a DII message has been set, the controller of the information processing apparatus 400 acquires the startup document of the entry component, and the processing advances to the processing of 1 above.

It should be noted that the processing may advance to the processing of 4 and 5 above by the same button operation as the I button in a document of a low-order page of a BML content instead of the startup document.

Accordingly, the user can conveniently select the broadcast of a data program that the user of the information processing apparatus 400 wishes to view under the environment where the data broadcast and Internet-related broadcast coexist.

[Structure of Information Processing Apparatus]

Figure 2:
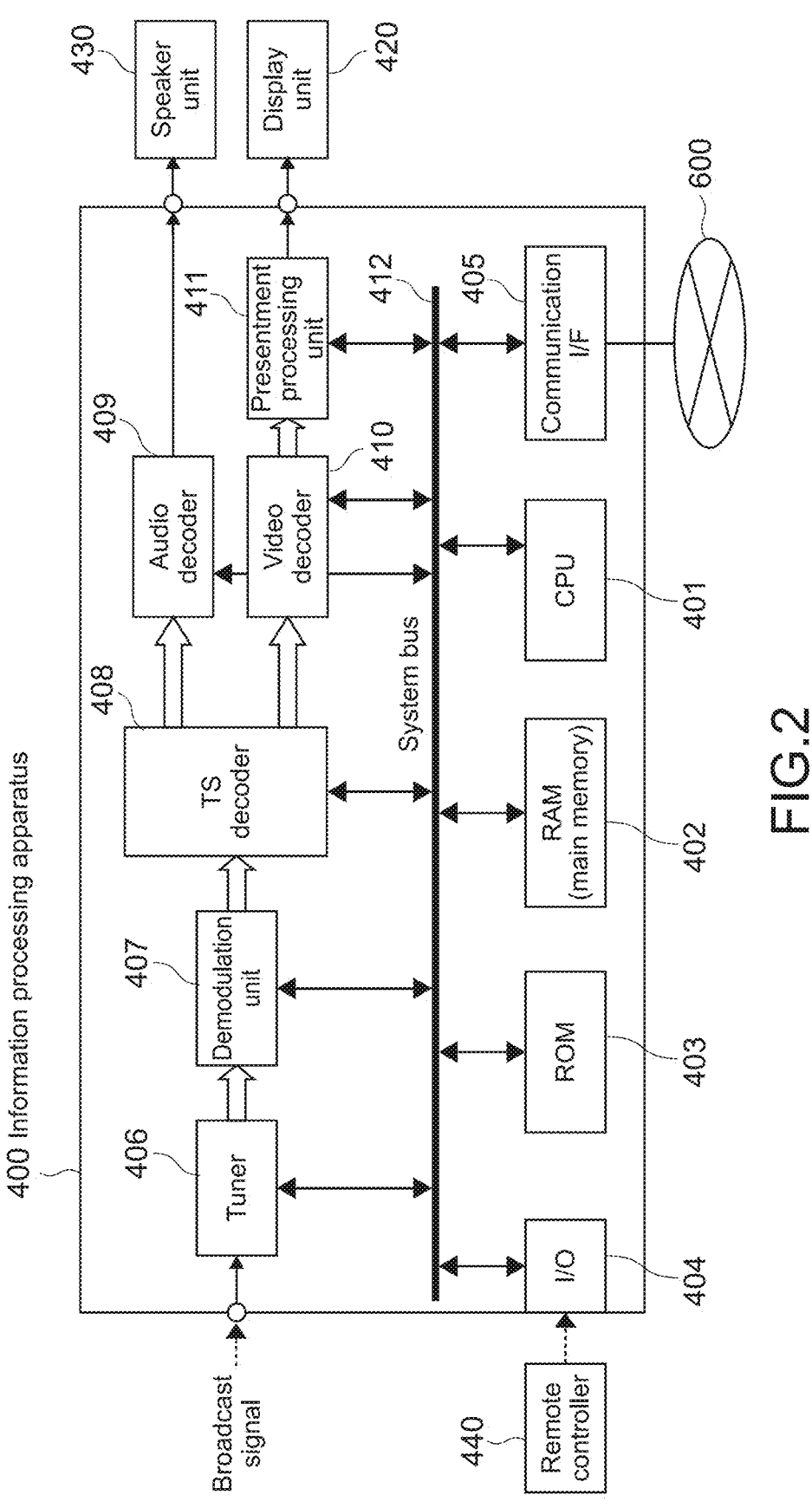
FIG. 2 A block diagram showing a structure of an information processing apparatus in the information processing system according to the first embodiment.

FIG. 2 is a block diagram showing a structure of the information processing apparatus 400 as a receiver.

The information processing apparatus 400 includes a CPU 401, a RAM (main memory) 402, a ROM 403, a remote controller I/O 404, a communication interface 405, a tuner 406, a demodulation unit 407, a TS decoder 408, an audio decoder 409, a video decoder 410, a presentment processing unit 411, and a system bus 412. Connected to the information processing apparatus 400 are a display unit 420 and a speaker unit 430.

The CPU 401 (controller) collectively controls the information processing apparatus 400 and carries out operational processing for executing a program.

The RAM (main memory) 402 is a random access memory that stores various programs and data to be interpreted and executed by the CPU 401.

The ROM 403 is a nonvolatile memory that fixedly stores various types of data used by the information processing apparatus 400, such as a font.

The remote controller I/O 404 inputs/outputs infrared signals and wireless signals with respect to a remote controller 440.

The communication interface 405 carries out processing for communication that uses the network transmission medium 600 such as the Internet and a local area network.

The tuner 406 receives digital broadcast signals via the broadcast wave transmission medium 500.

The demodulation unit 407 demodulates the digital broadcast signals received by the tuner 406 and restores a TS (Transport Stream).

The TS decoder 408 sorts the transport stream (MPEG-2 TS) for each elementary stream to separate it into an audio stream, a video stream, a data carousel (BML content), an event message, an AIT section, and the like.

The audio decoder 409 decodes the audio signals separated by the TS decoder 408 and outputs them to the speaker unit 430.

The video decoder 410 decodes the video signals separated by the TS decoder 408 and supplies them to the presentment processing unit 411.

Further, the data carousel, the event message, and the AIT section separated by the TS decoder 408 are supplied to the CPU 401. The CPU 401 processes the data carousel according to a data broadcast processing program developed in the RAM 402 and carries out a generation of video data of the data broadcast and Internet-related broadcast, processing based on a pullback flag in a DII message, processing based on the event message, processing of the AIT section, and the like.

The presentment processing unit 411 synthesizes a video signal from the video decoder 410 and a graphics image, letters, and the like generated by the CPU 401 to generate data to be presented on the screen of the display unit 420 and outputs the data to the display unit 420.

[Switch Operation from Data Broadcast to Internet-Related Broadcast]

Next, a switch operation from the data broadcast to the Internet-related broadcast in the information processing apparatus 400 of the information processing system 1 according to the first embodiment will be described.

Figure 8:
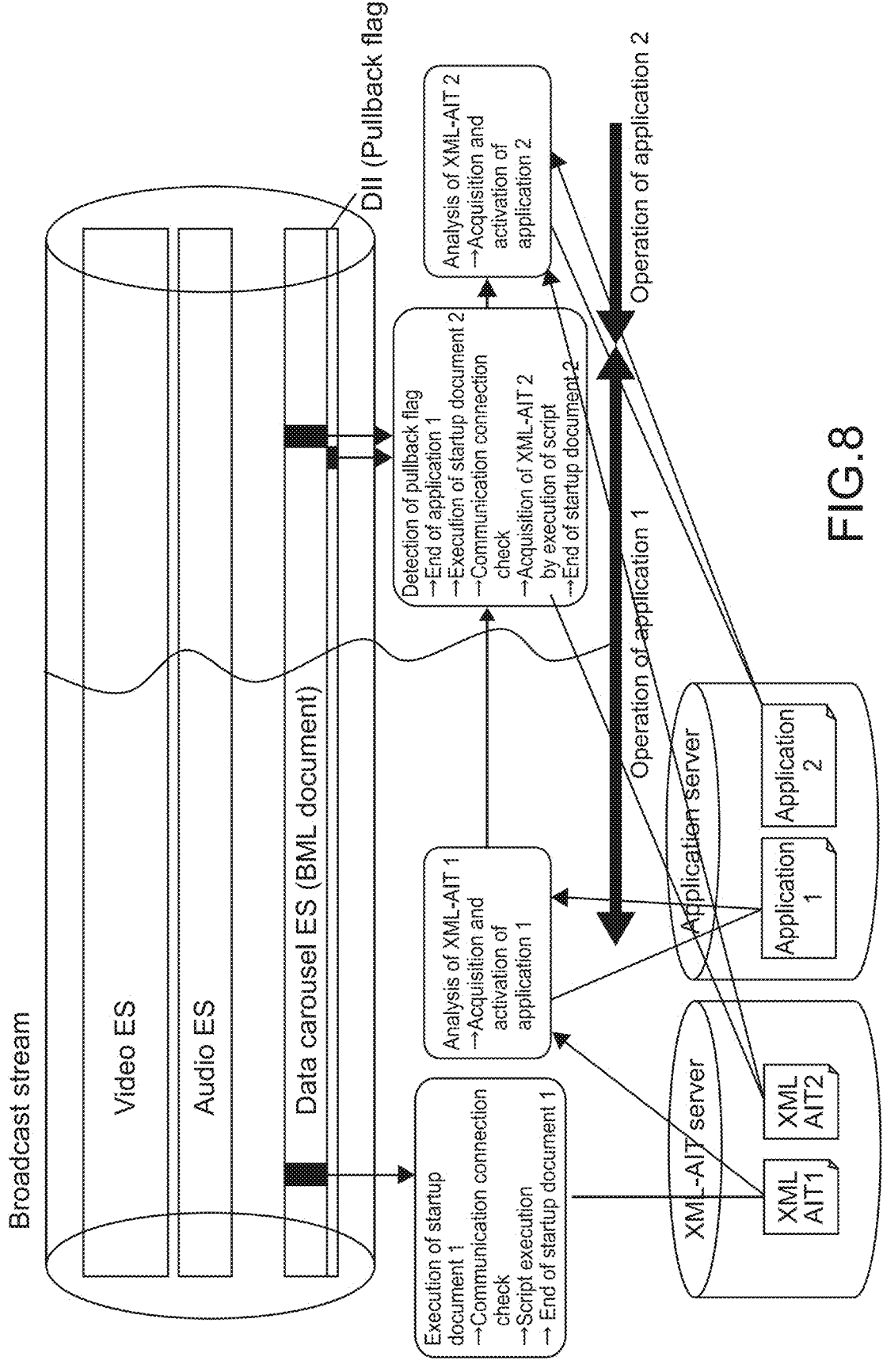
FIG. 8 An explanatory diagram of a switch operation from data broadcast to Internet-related broadcast by the information processing apparatus according to the first embodiment.

FIG. 8 is an explanatory diagram of the switch operation by the information processing apparatus according to the first embodiment.

Figure 9:
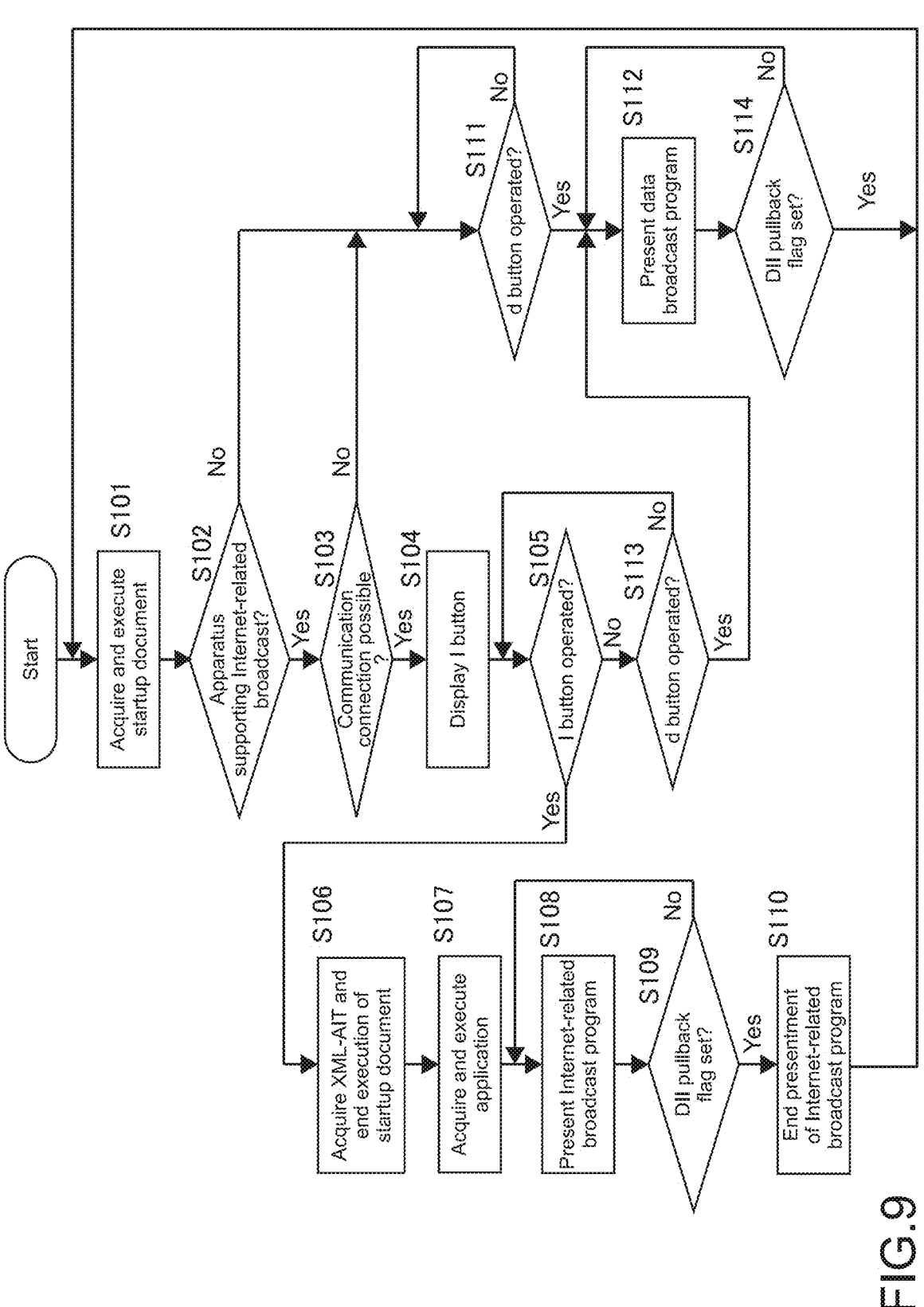
FIG. 9 A flowchart showing the switch operation of FIG. 8.

FIG. 9 is a flowchart showing the switch operation of FIG. 8. The flowchart shows a flow of processing that is based on the data broadcast processing program, the processing being carried out by the CPU 401 (controller) of the information processing apparatus 400.

Figure 10:
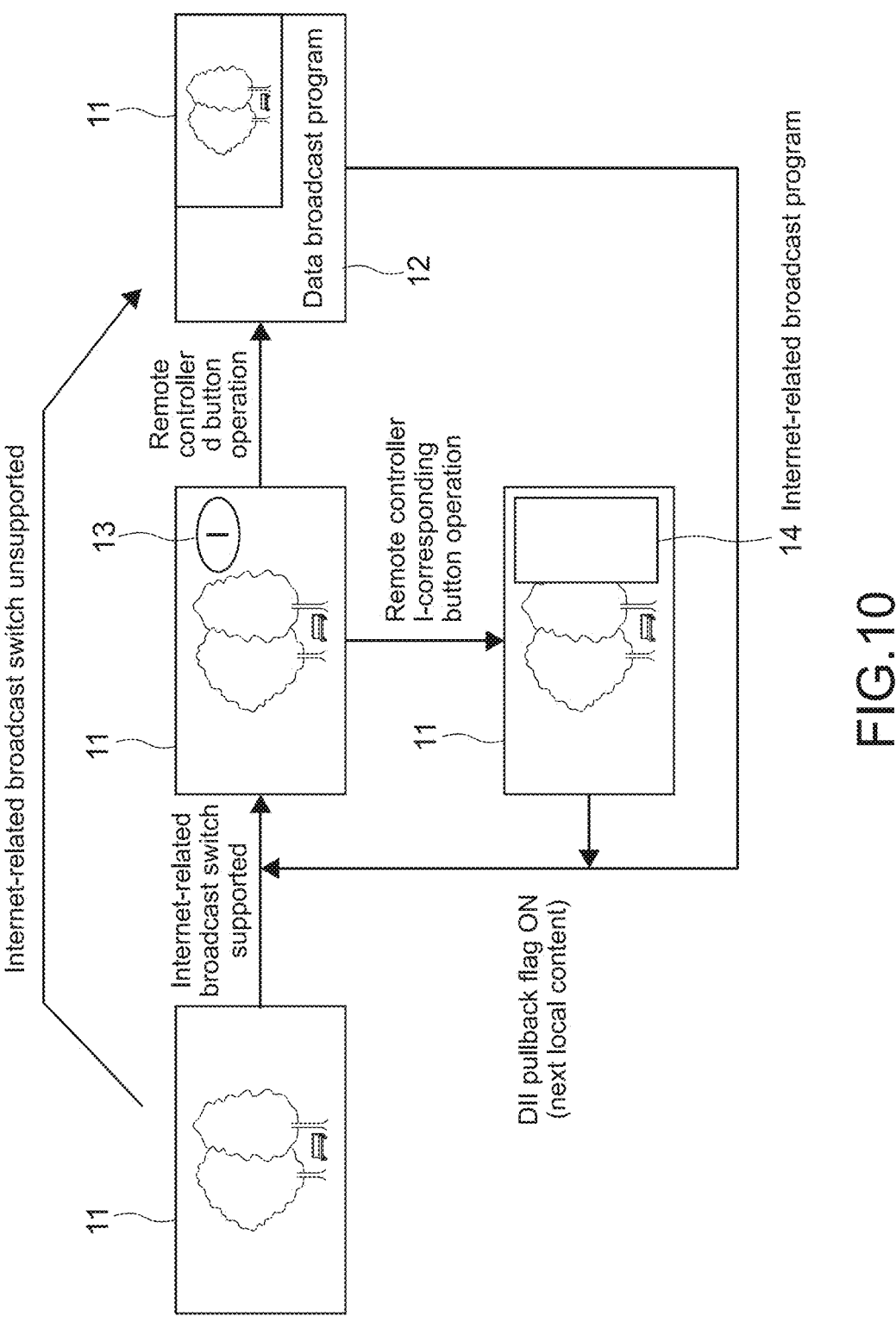
FIG. 10 A diagram showing a screen shift related to the switch operation of FIG. 8.

FIG. 10 is a diagram showing a screen shift related to the switch operation of FIG. 8.

In this embodiment, a case where at least a real-time stream of a video, audio, and the like and components of a data carousel are broadcasted from the broadcast station 100 will be discussed.

The components of a data carousel are each an entry component including a startup document.

In this embodiment, a pullback flag is used as a trigger for causing, along with a switch of a startup document of an entry component, the information processing apparatus 400 to acquire the startup document. It should be noted that the present disclosure is not limited to the pullback flag.

In the information processing apparatus 400, upon acquiring a startup document of an entry component related to the data broadcast, the CPU 401 interprets the startup document and starts executing it (Step S101). The subsequent Steps 102 to 106 and Steps 111 to 113 are procedures that are performed by executing a script of the startup document. In executing the script of the acquired startup document, the CPU 401 judges whether the information processing apparatus 400 supports the Internet-related broadcast (Step S102).

When the information processing apparatus 400 supports the Internet-related broadcast (YES in Step S102), the CPU 401 checks whether a connection to the Internet is possible (Step S103). For example, the CPU 401 outputs, to the communication interface 405, a command for checking a connection state with respect to the Internet and checks a response from the communication interface 405 with respect to the command to check whether the connection to the Internet is possible.

When judged that the connection to the Internet is possible (YES in Step S103), the CPU 401 generates graphic data of an Internet-related broadcast switch button (hereinafter, referred to as "I button") to be synthesized on a TV program that is being displayed on the display unit 420 and supplies the data to the presentment processing unit 411. As a result, as shown in FIG. 10, an image 13 of the I button is synthesized on a video 11 of the TV program and displayed (Step S104). Here, when wishing to view an Internet-related broadcast program, the user only needs to operate a predetermined button to which a function as the I button is allocated in the remote controller 440. When wishing to view a data broadcast program, the user only needs to operate the d button of the remote controller 440.

Upon detecting that the predetermined button to which the function as the I button is allocated in the remote controller 440 has been operated by the user (YES in Step S105), the CPU 401 executes the processing for presenting the Internet-related broadcast program as follows.

The startup document corresponding to the switch to the Internet-related broadcast stores a script of an application activation function that has, as an argument value, location information of an XML-AIT file for managing a life cycle of an Internet-related broadcast application and the like.

Upon detecting that the predetermined button to which the function as the I button is allocated in the remote controller 440 has been operated (YES in Step S105), the CPU 401 executes the script. As a result, the CPU 401 ends the execution of the script after accessing the XML-AIT server 200 and acquiring the XML-AIT file (Step S106).

Subsequently, based on the application location information described in the XML-AIT file and the like, the CPU 401 accesses the application server 300 to acquire a relevant application and immediately activates it (Step S107). Accordingly, as shown in FIG. 10, an Internet-related broadcast program structured by synthesizing an image 14 of the application on the video 11 of the TV program is presented (Step S108).

Upon detecting that a pullback flag is set in a DII message of the entry component while the Internet-related broadcast program is being presented (YES in Step S109), the CPU 401 ends the presentment of the Internet-related broadcast program (Step S110). Subsequently, the CPU 401 returns to Step S101 to acquire a new startup document of the entry component and executes it. After that, the processing of Step S102 and the subsequent steps is repeated in the same way.

Further, when the information processing apparatus 400 does not support the Internet-related broadcast in Step S102 (NO in Step S102), the CPU 401 sets an operation of the d (data) button of the remote controller 440 for switching display/non-display of multimedia data broadcast to a standby state (Step S111).

It should be noted that even when it is judged that the information processing apparatus 400 supports the Internet-related broadcast, the operation of the d button is similarly set to the standby state when the connection to the Internet is judged as impossible in Step S103 (NO in Step S103) (Step S111).

When the d button of the remote controller 440 is operated by the user and an operation signal corresponding to the operation is input from the remote controller 440, the CPU 401 acquires a low-order page document according to a script of the startup document, generates presentment data thereof, and supplies it to the presentment processing unit 411. As a result, as shown in FIG. 10, a data broadcast program including the video 11 of the TV program and the image 12 for data broadcast is presented on the screen of the display unit 420 (Step S112).

It should be noted that also when the d button of the remote controller 440 is operated by the user while the image 13 of the I button is synthesized and displayed on the video 11 of the TV program (YES in Step S113), the CPU 401 acquires a low-order page document according to a script of the startup document, generates presentment data thereof, and supplies it to the presentment processing unit 411. Therefore, also in this case, a data broadcast program including the video 11 of the TV program and the image 12 for data broadcast is presented on the screen of the display unit 420 (Step S112).

Upon detecting that a pullback flag is set in a DII message of the received entry component (YES in Step S114) while a data broadcast program including the video 11 of the TV program and the image 12 for data broadcast is being presented on the screen of the display unit 420, the CPU 401 returns to Step S101 to again acquire a startup document of the entry component and executes it. After that, the processing of Step S102 and the subsequent steps is repeated in the same way.

As described above, in this embodiment, the user can conveniently make a switch between the data broadcast and the Internet-related broadcast for a data program to be presented based on a user selection under the environment where the data broadcast and the Internet-related broadcast coexist.

In this embodiment, a script for causing the information processing apparatus 400 to acquire an XML-AIT file corresponding to an Internet-related broadcast application is transmitted to the information processing apparatus 400 by a startup document of an entry component. As a result, the script can be transmitted to the information processing apparatus 400 without leakage.

In this embodiment, the information processing apparatus 400 acquires a startup document of an entry component with a setting of a pullback flag of a DII message as a trigger. By causing the pullback flag of the DII message to be set in sync with an update of a script stored in the startup document, a timing for transmitting the updated script to the information processing apparatus 400 can be controlled on the broadcast station 10 side.

In this embodiment, since the I button is displayed to become responsive only when it is confirmed that the information processing apparatus 400 is connected to the Internet, operational stability and reliability can be improved.

Second Embodiment

This embodiment adopts an event of a data event switch in place of a pullback flag in a DII message in the first embodiment as a trigger for causing the information processing apparatus 400 to acquire and execute a startup document storing a script. This is because, specifically, the switch of a data event of an entry component occurs by a switch of a BML content.

Figure 11:
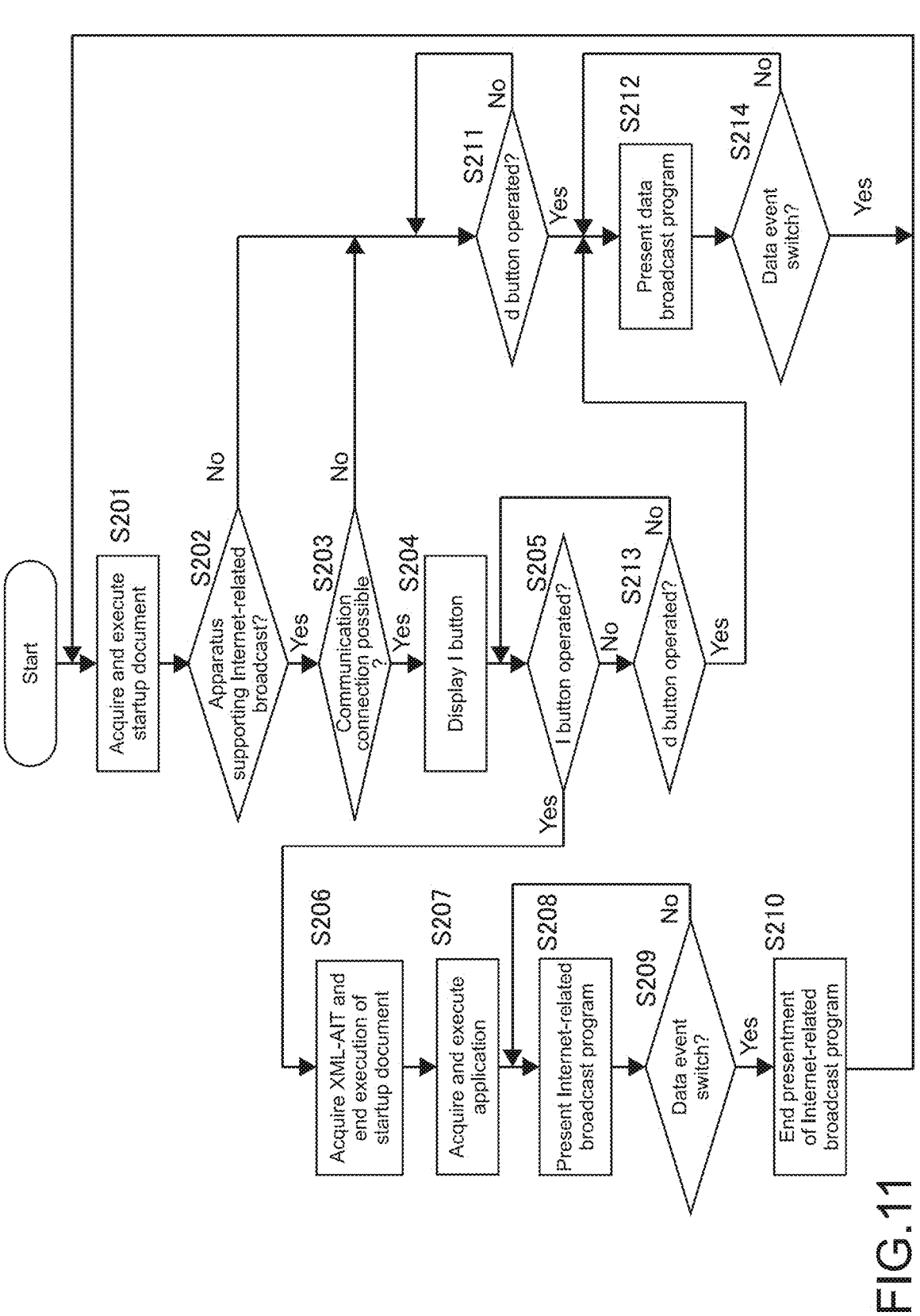
FIG. 11 A flowchart showing an operation of the information processing apparatus according to a second embodiment of the present disclosure.

FIG. 11 is a flowchart showing an operation of the information processing apparatus according to a second embodiment of the present disclosure.

Here, operations from Step S201 to the presentment of an Internet-related broadcast program in S208 and operations from Step S201 to the presentment of a data broadcast program in S212 are the same as those of the first embodiment.

In this embodiment, the CPU 401 of the information processing apparatus 400 waits for an occurrence of a data event switch of an entry component while an Internet-related broadcast program is presented in Step S208 (Step S209). When the data event switch of an entry component occurs (YES in Step S209), the CPU 401 ends the presentment of the Internet-related broadcast program (Step S210). Here, the data event switch of an entry component is detected as a data event ID of a DII message transmitted by the entry component is updated. Subsequently, the CPU 401 returns to Step S201 to acquire and execute a new startup document of the entry component. After that, the processing of Step S202 and the subsequent steps is repeated in the same way.

Further, when the data event switch of the entry component occurs while the data broadcast program is presented in Step S212 (YES in Step S214), the CPU 401 returns to Step S201 to acquire and execute a new startup document of the entry component. After that, the processing of Step S202 and the subsequent steps is repeated in the same way.

Even when the data event switch is used as a trigger for causing the information processing apparatus 400 to acquire a startup document storing a script as described above, the same effects as in the first embodiment can be obtained.

Third Embodiment

This embodiment uses an event message including a specific event message ID as a trigger for causing the information processing apparatus 400 to acquire and execute a startup document storing a script. The event message including a specific event message ID is transmitted by an event message component in accordance with a switch of a BML content of an entry component.

Figure 12:
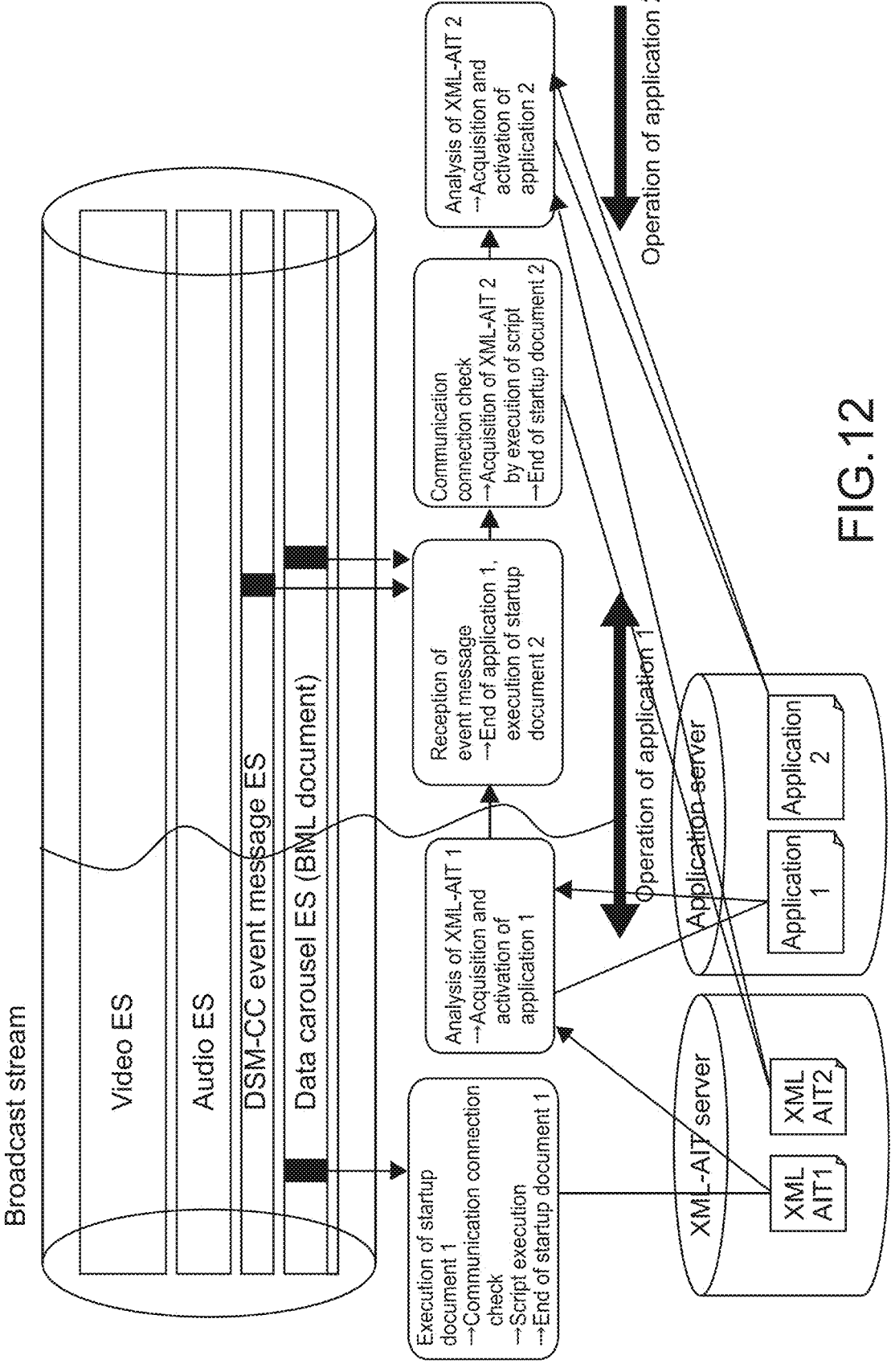
FIG. 12 A diagram for explaining a switch operation by the information processing apparatus according to a third embodiment of the present disclosure.
Figure 13:
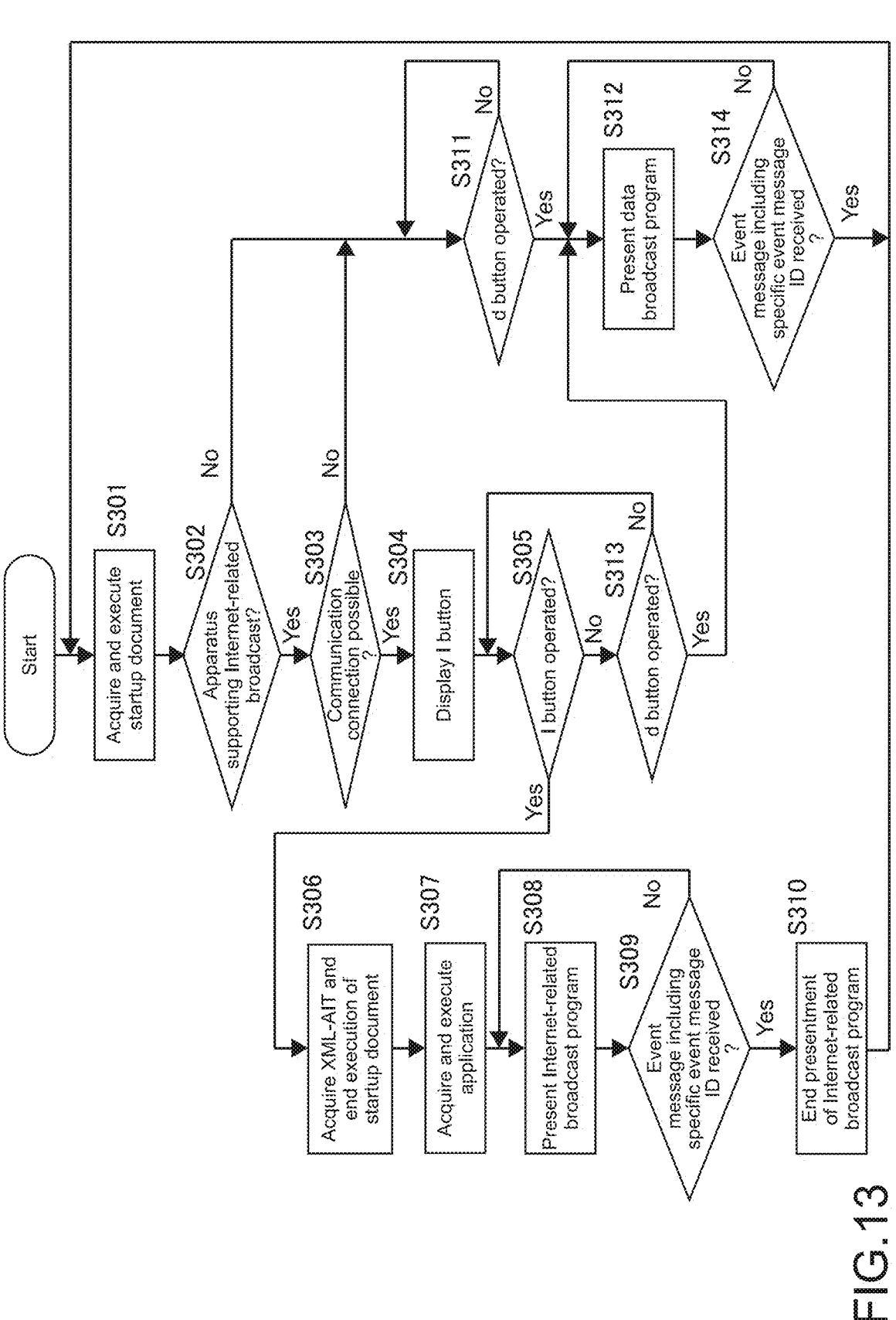
FIG. 13 A flowchart showing the switch operation of FIG. 12.

FIG. 12 is a diagram for explaining a switch operation by the information processing apparatus according to a third embodiment of the present disclosure. FIG. 13 is a flowchart showing the switch operation.

In this embodiment, a case where a real-time stream of a video, audio, and the like and components of a data carousel and event message are broadcasted from the broadcast station 100 will be discussed.

It should be noted that in FIG. 12, a component of a data carousel is an entry component including a startup document.

Operations from Step S301 to the presentment of an Internet-related broadcast program in S308 and operations from Step S301 to the presentment of a data broadcast program in S312 are the same as those e of the first embodiment.

While an Internet-related broadcast program is being presented in Step S308, the CPU 401 of the information processing apparatus 400 waits for a reception of an event message including a specific event message ID (Step S309). Upon receiving the event message including a specific event message ID (YES in Step S309), the CPU 401 returns to Step 3201 to acquire and execute a startup document of an entry component as in the first embodiment after ending the presentment of an Internet-related broadcast program according to a description of a script of an application (Step S310). After that, the processing of Step S302 and the subsequent steps is repeated in the same way.

Also after the presentment of a data broadcast program in Step S312, the CPU 401 of the information processing apparatus 400 waits for a reception of an event message including a specific event message ID (Step S314), and upon receiving the event message (YES in Step S314), returns to Step S301 to acquire and execute a startup document of the entry component as in the first embodiment. After that, the processing of Step S302 and the subsequent steps is repeated in the same way.

As a result, the third embodiment also bears the same effects as the first embodiment.

Fourth Embodiment

Figure 14:
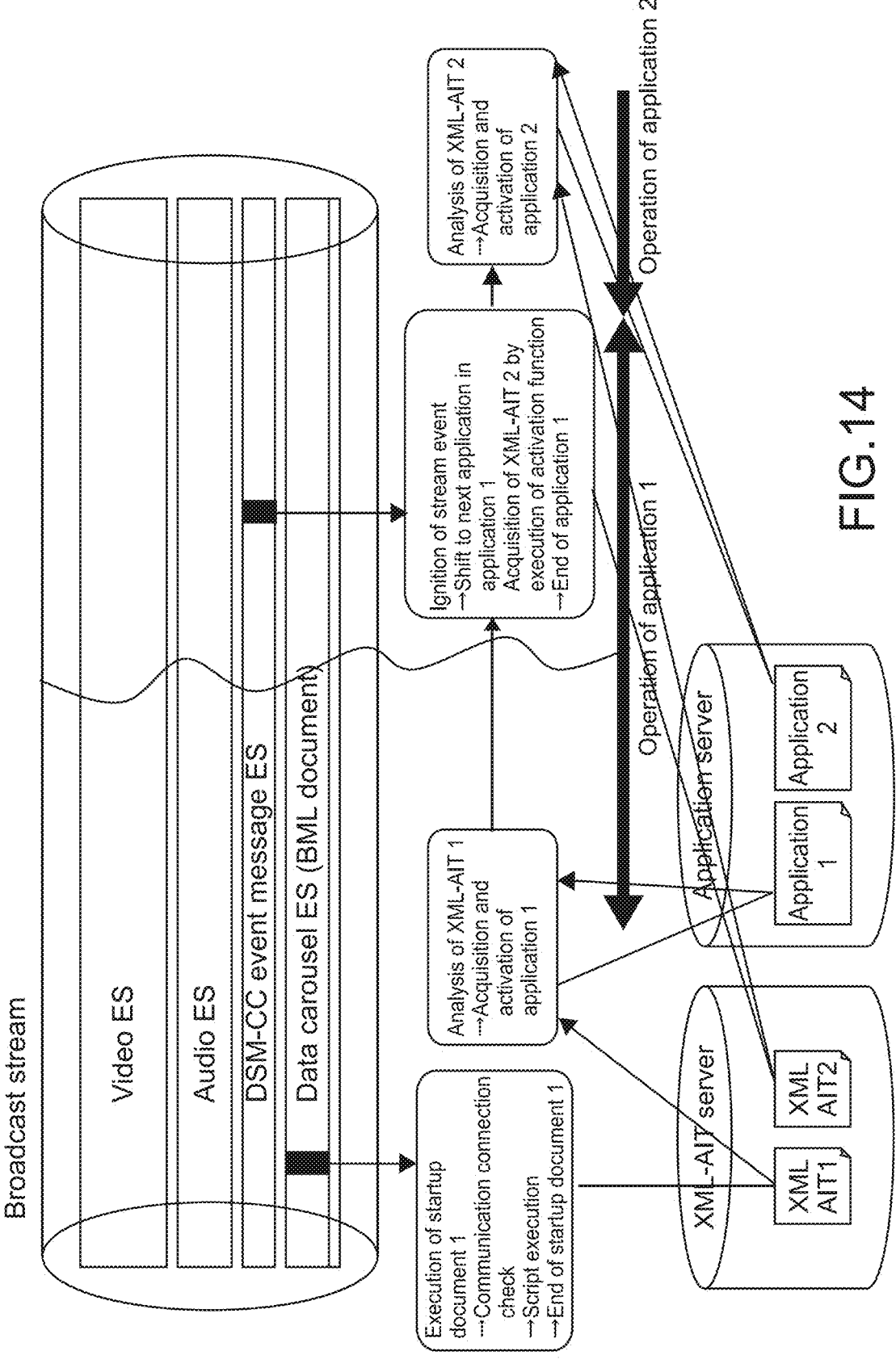
FIG. 14 A diagram for explaining a switch operation by the information processing apparatus according to a fourth embodiment of the present disclosure.

FIG. 14 is a diagram for explaining a switch operation by the information processing apparatus according to a fourth embodiment of the present disclosure.

Figure 15:
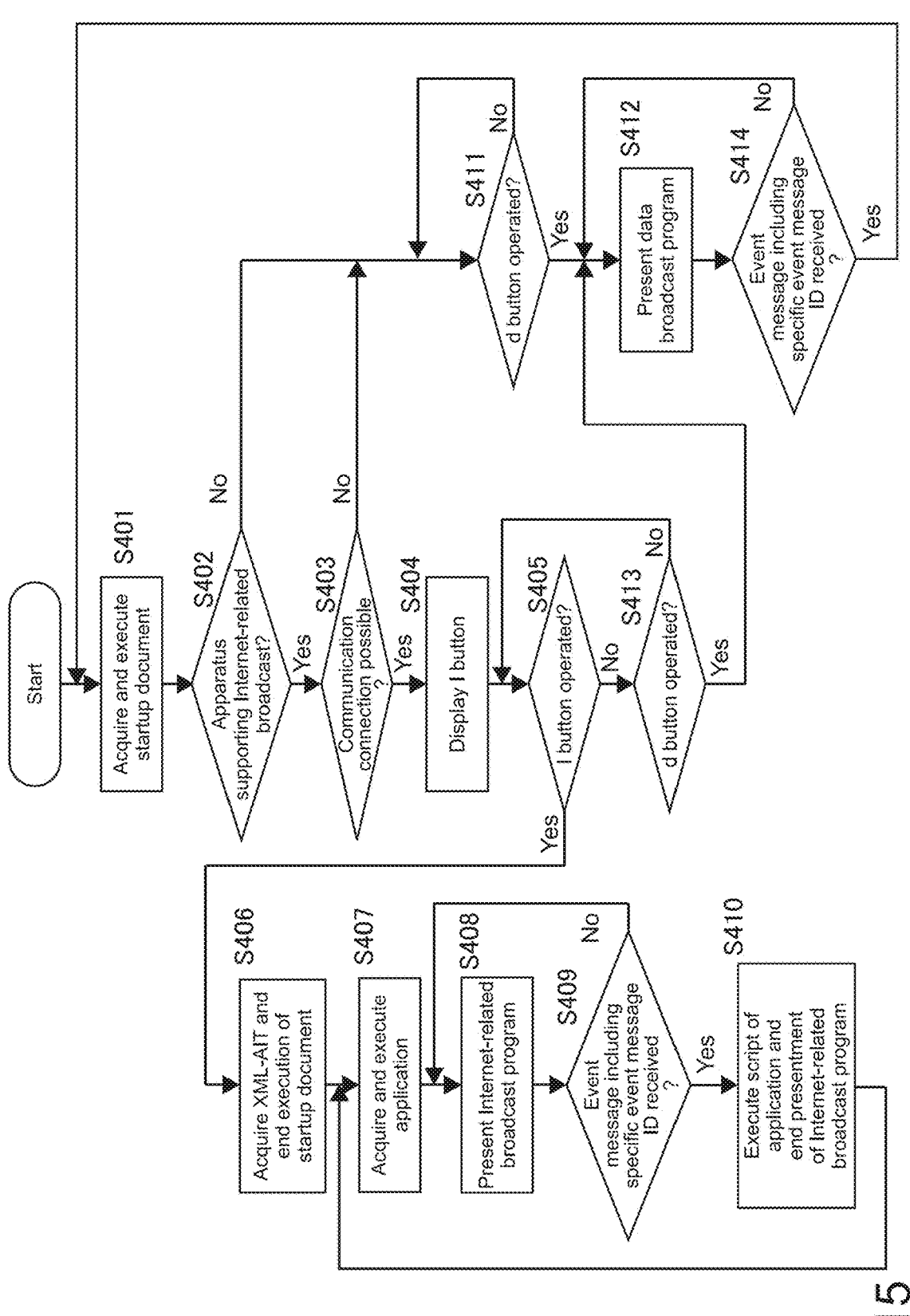
FIG. 15 A flowchart showing the switch operation of FIG. 14.

FIG. 15 is a flowchart showing the switch operation.

In the fourth embodiment, a case where a script having the same function as the script stored in a startup document is also stored in an Internet-related broadcast application will be discussed. In the fourth embodiment, upon receiving an event message including a specific event message ID while an Internet-related broadcast application is being executed (YES in Step S409), the script stored in the application being executed is executed. Accordingly, after accessing the XML-AIT server 200 and acquiring a relevant XML-AIT file, the CPU 401 ends the execution of the Internet-related broadcast application (Step S410). Subsequently, based on application location information described in the XML-AIT file and the like, the CPU 401 accesses the application server 300 to acquire and immediately activate a relevant application (Step S407). As a result, a new Internet-related broadcast program is presented (Step S408).

It should be noted that when an event message including a specific event message ID is received while a data broadcast program is being presented (YES in Step S414), the CPU 401 returns to Step S401 to acquire and execute a startup document of an entry component as in the second embodiment. Accordingly, the processing of Step S402 and the subsequent steps is repeated in the same way.

In the fourth embodiment, there is no need to check whether a connection to the Internet is possible when a certain Internet-related broadcast program is switched to the next Internet-related broadcast program to be presented. As a result, a switch speed of the Internet-related broadcast can be raised.

It should be noted that in the fourth embodiment, when an event message including a specific event message ID is received while a data broadcast program is being presented, the processing returns to Step S401 to acquire and execute a startup document of an entry component as in the second embodiment. However, the trigger in this case is not limited to the event message including a specific event message ID and may instead be a pullback flag, a data event switch, and the like.

Fifth Embodiment

This embodiment uses a timer as a trigger for causing the information processing apparatus 400 to acquire and execute a startup document storing a script. The CPU 401 of the information processing apparatus 400 executes a script stored in an Internet-related broadcast application to set the timer value.

Figure 16:
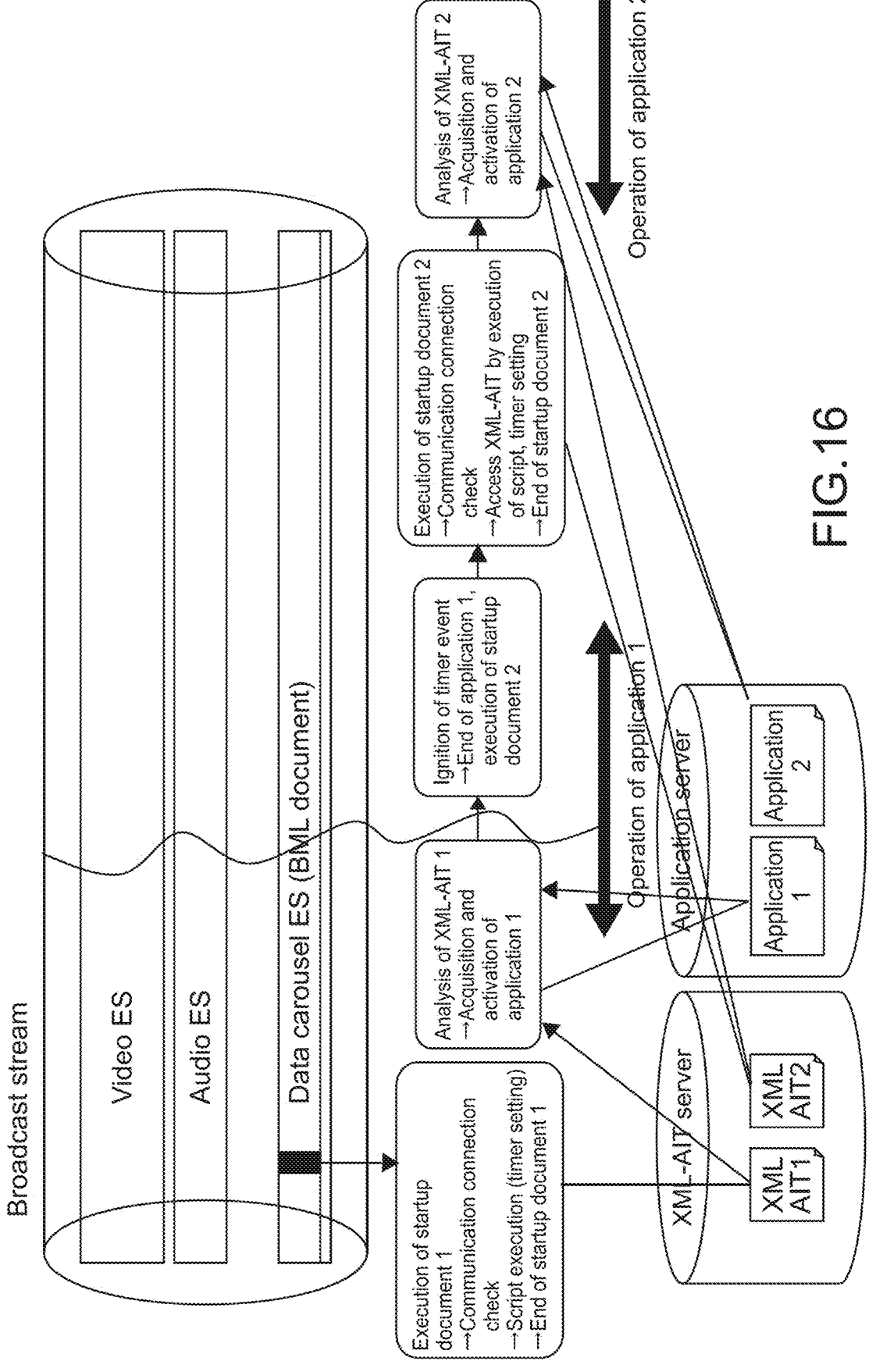
FIG. 16 A diagram for explaining a switch operation by the information processing apparatus according to a fifth embodiment of the present disclosure.
Figure 17:
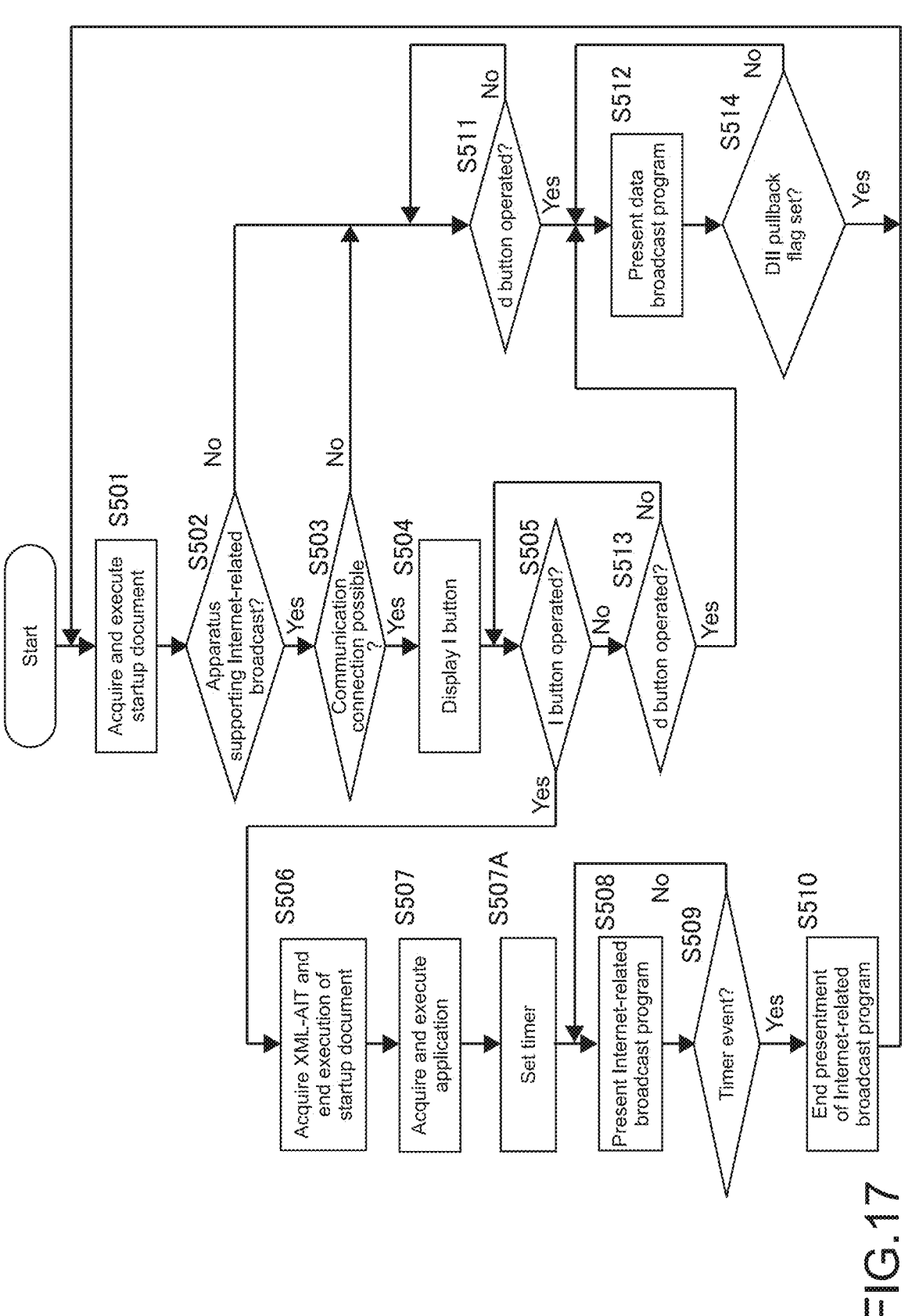
FIG. 17 A flowchart showing the switch operation of FIG. 16.

FIG. 16 is a diagram for explaining a switch operation by the information processing apparatus according to a fifth embodiment of the present disclosure. FIG. 17 is a flowchart showing the switch operation.

In this embodiment, a case where a real-time stream of a video, audio, and the like and components of a data carousel are broadcasted from the broadcast station 100 will be discussed.

Operations from Step S501 to the acquisition and execution of an application in S507 and operations from Step S501 to the judgment of a pullback flag in S514 are the same as those of the first embodiment.

Before presenting an Internet-related broadcast program by executing an application, the CPU 401 of the information processing apparatus 400 executes a timer setting script stored in the application. According to a processing procedure of the script, the CPU 401 calculates a time from the current time to an end time of the Internet-related broadcast program, sets the calculation result as a timer setting time, and starts the timer count (Step S507A).

Figure 18:
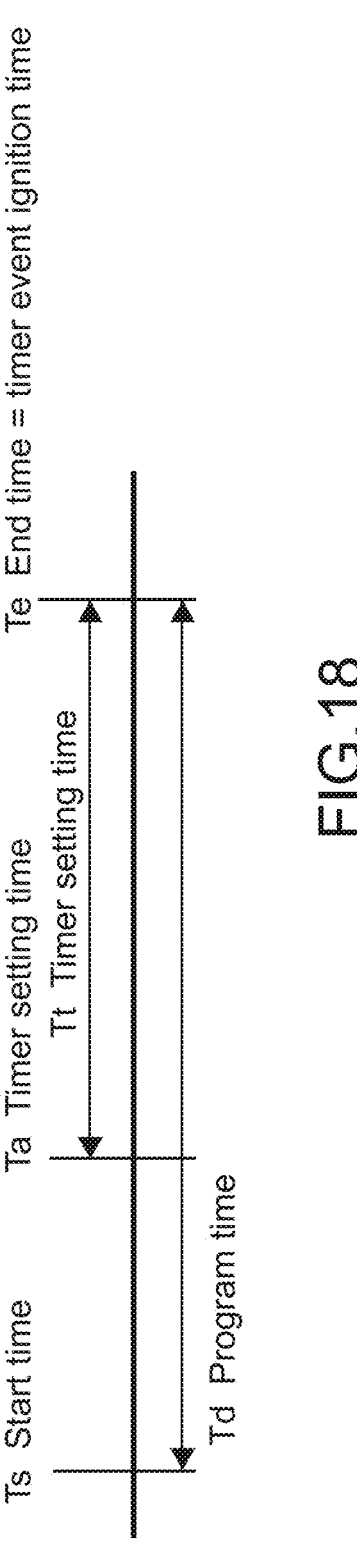
FIG. 18 A diagram showing a timer setting time calculation method.

FIG. 18 is a diagram showing a timer setting time calculation method.

Ts represents a start time of Internet-related broadcast,

Te represents an end time of the Internet-related broadcast,

Ta represents a timer setting execution time (current time),

Td represents an entire time of the Internet-related broadcast, and

Tt represents a timer setting time (relative time).

The start time Ts and the entire time Td can be preset in an Internet-related broadcast application presupposing the present program, and the current time Ta can be obtained by executing an application function.

The timer setting time Tt can be obtained by the following expression.

$$Tt = Ts + Td - Ta$$

15

Upon completing the timer setting, the CPU 401 presents the Internet-related broadcast program according to the application (Step S508).

After that, upon judging that the timer count value has reached the timer setting time (timer event ignition) (Step S509), the CPU 401 ends the presentment of the Internet-related broadcast program (Step S510). Subsequently, the CPU 401 returns to Step S501 to acquire and execute a startup document of an entry component. After that, the processing of Step S502 and the subsequent steps is repeated in the same way.

In the fifth embodiment, a certain Internet-related broadcast program can be switched to the next Internet-related broadcast program without having to check whether a connection to the Internet is possible as in the fourth embodiment. As a result, a switch speed of the Internet-related broadcast program can be raised.

It should be noted that in this embodiment, upon detecting that a pullback flag has been set in a DII message of an entry component while a data broadcast program is being presented (YES in Step S514), the processing returns to Step S501 to reacquire and execute a startup document of an entry component. The trigger in this case is not limited to the pullback flag and may instead be a data event switch, an event message including a specific event message ID in a case where an event message component is transmitted, and the like.

Sixth Embodiment

Although an XML-AIT is adopted as the information for controlling a life cycle of an Internet-related broadcast application in the embodiments above, an AIT provided by broadcast signals may be used instead of the XML-AIT.

Figure 19:
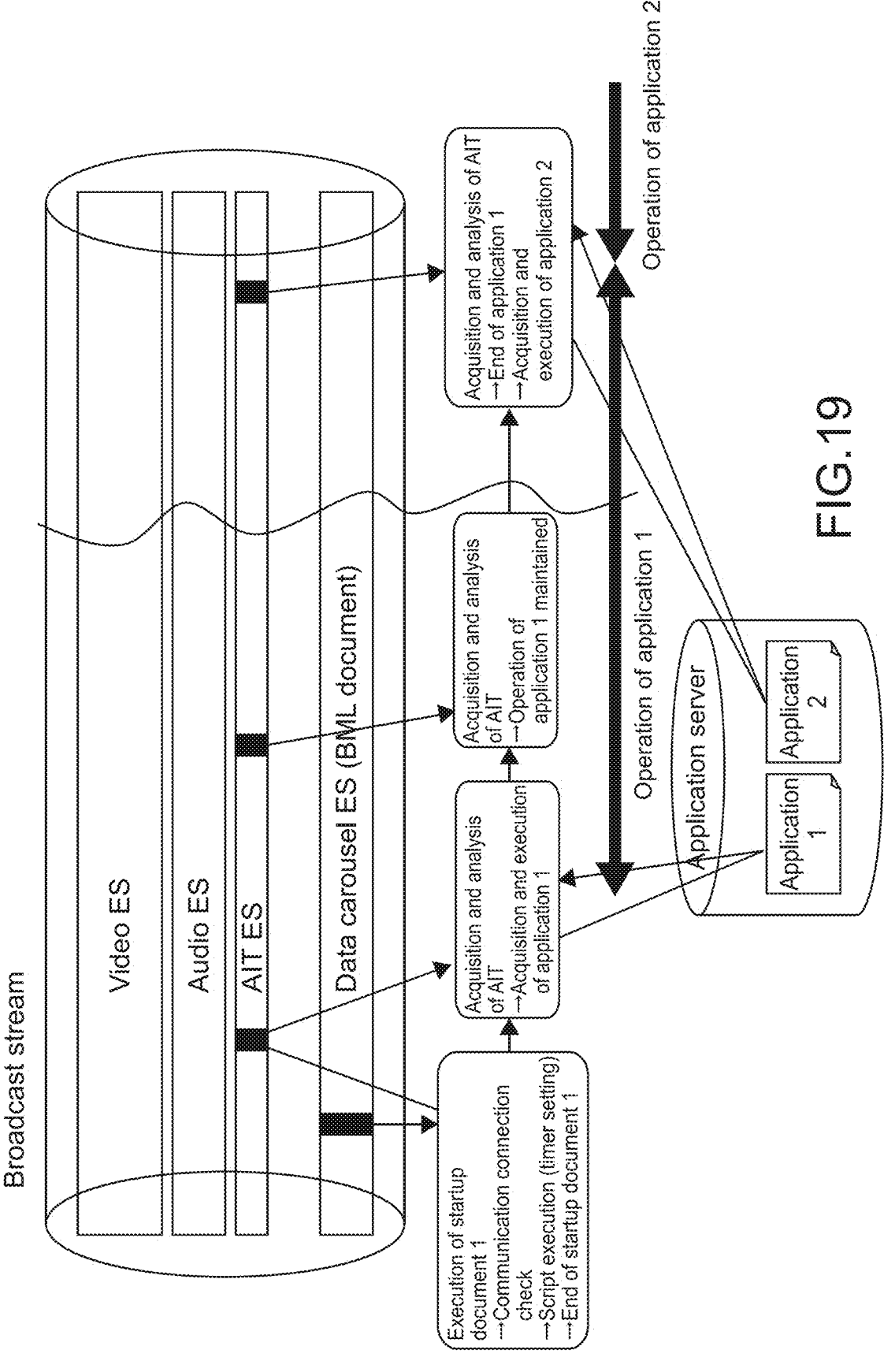
FIG. 19 A diagram for explaining a switch operation by the information processing apparatus according to a sixth embodiment of the present disclosure.
Figure 20:
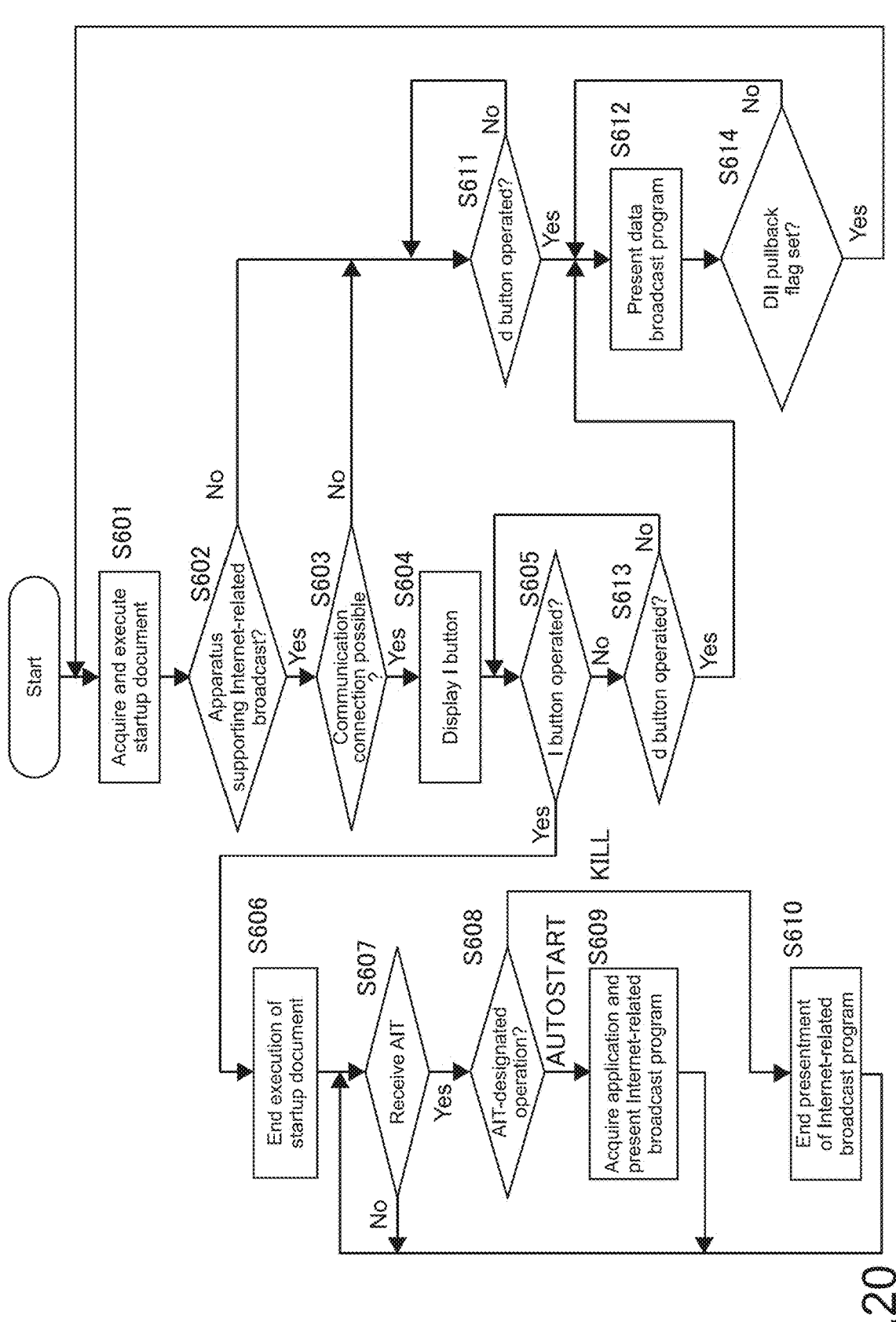
FIG. 20 A flowchart showing the switch operation of FIG. 19.

FIG. 19 is a diagram for explaining a switch operation by the information processing apparatus according to a sixth embodiment of the present disclosure. FIG. 20 is a flowchart showing the switch operation.

In this embodiment, a case where a real-time stream of a video, audio, and the like and components of a data carousel are broadcasted from the broadcast station 100 will be discussed.

Operations from Step S601 to the execution end of a startup document in S606 and operations from Step S601 to the judgment of a pullback flag in S614 are the same as those of the first embodiment.

After ending the execution of a startup document in Step S606, the CPU 401 of the information processing apparatus 400 waits for a reception of an AIT (Step S607). Upon receiving the AIT, the CPU 401 starts controlling an operation of an application to be managed based on the AIT according to an application control code described in the acquired AIT.

When the application control code described in the AIT is "AUTOSTART", the CPU 401 accesses the application server 300 to acquire and immediately activate a relevant application based on location information of the application to be managed, that is described in the AIT. As a result, the Internet-related broadcast program is presented (Step S609).

Upon receiving an AIT whose application control code is "KILL" while the Internet-related broadcast program is being presented, the CPU 401 ends the operation of the application to end the presentment of the Internet-related broadcast program (Step S610).

After that, every time an AIT is received, the CPU 401 repeats the activation and end of an application designated by the AIT to switch Internet-related broadcast program one after the other for presentment.

It should be noted that in this embodiment, upon detecting that a pullback flag has been set in a DII message of an entry component while a data broadcast program is being presented (YES in Step S614), the processing returns to Step S601 to reacquire and execute a startup document of an entry component. The trigger in this case is not limited to the pullback flag and may instead be a data event switch, an event message including a specific event message ID in a case where an event message component is transmitted, and the like.

It should be noted that the present disclosure may also take the following structures.

(1) An information processing apparatus, including
a controller that acquires a multimedia document of data broadcast including instruction information that instructs to acquire application control information related to an application for presenting a data program related to a television program, acquires the application control information based on the instruction information stored in the acquired multimedia document, acquires the application based on the application control information, and executes the application to present the data program.

(2) The information processing apparatus according to (1) above,
in which the controller ends, along with a switch of the multimedia document of the data broadcast accompanied by an update of the multimedia document while the data program is being presented based on the application, the execution of the application and acquires the switched multimedia document.

(3) The information processing apparatus according to (1) or (2) above,
in which the controller acquires, while a second data program is being presented by the data broadcast, the switched multimedia document according to the switch of the multimedia document of the data broadcast accompanied by the update of the multimedia document.

(4) The information processing apparatus according to any one of (1) to (3) above,
in which the controller acquires, upon receiving an instruction from a user, the application control information via the Internet based on the instruction information stored in the multimedia document.

(5) The information processing apparatus according to any one of (1) to (3) above,
in which the controller acquires, upon receiving an instruction from a user, the application control information via the broadcast waves based on the instruction information stored in the multimedia document.

(6) The information processing apparatus according to any one of (1) to (5) above,
in which the controller acquires the switched multimedia document upon detecting that a pullback flag of a DII (Download Info Indication) message has been set.

(7) The information processing apparatus according to any one of (1) to (5) above,
in which the controller acquires the switched multimedia document upon detecting a switch of a data event.

(8) The information processing apparatus according to any one of (1) to (5) above, in which the controller acquires the switched multimedia document upon receiving an event message including a specific event message ID.

(9) The information processing apparatus according to any one of (1) to (5) above, in which the controller calculates a time up to an end of the execution of the application, starts a timer count as well as set the calculation result as a timer setting value, and acquires the switched multimedia document when a value of the timer count reaches the timer setting value.

REFERENCE SIGNS LIST 100 broadcast station
200 XML-AIT server
300 application server
400 information processing apparatus
401 CPU
402 RAM
403 ROM
404 remote controller I/O
405 communication interface
406 tuner
407 demodulation unit
408 TS decoder
409 audio decoder
410 video decoder
411 presentment processing unit
412 system bus
420 display unit
430 speaker unit
440 remote controller

The invention claimed is:

1. An information processing apparatus, comprising receiving circuitry configured to:

receive, via a broadcast transmission path, signaling information including instruction information to acquire application control information related to a first application for presenting an Internet-broadcast program related to a broadcast program provided via the broadcast transmission path; and processing circuitry configured to:

generate a display screen including an icon by execution of the instruction information on a basis of a determination that the information processing apparatus supports an Internet-related broadcast and a determination that a connection to a network is available, wherein the display screen is generated according to a script included in the instruction information, acquire the application control information on a basis of reception of an operation of the icon, acquire the first application via the network on a basis of application location information included in the application control information, execute the first application to present the Internet-broadcast program, end the first application on a basis of information indicating a switch to a second application for presenting an Internet-broadcast program different from the Internet-broadcast program of the first application, the second application being different from the first application, and the information indicating the switch to the second application being accompanied by an update of the signaling information while the Internet-broadcast program is being presented by the first application, and acquire the second application, wherein when the display screen including the icon is displayed and a button for a data broadcast program is operated the icon is deleted from the display screen and the data broadcast program is displayed on the display screen, wherein the icon is synthesized on a TV program that is being displayed on the display screen, wherein when the display screen including the icon is displayed and the button for the data broadcast program is operated, the data broadcast program is displayed on the display screen with the TV program, wherein when the display screen including the icon is displayed and a button corresponding to operation of the icon is operated, the Internet-broadcast program is displayed on the display screen with the TV program, and wherein when a determination is made that the information processing apparatus does not support an Internet-related broadcast or that a connection to the network is not available, the button for the data broadcast program is set to a standby state, and when the button for the data broadcast program is in the standby state and is operated, the information processing apparatus acquires a low-order page document according to a script of the instruction information, generates presentment data for the low-order page document, and displays, according the presentment data, the data broadcast program with the TV program.

2. The information processing apparatus according to claim 1, wherein the processing circuitry is configured to acquire the application control information via the network on a basis of the reception of the operation of the icon.

3. The information processing apparatus according to claim 2, wherein the processing circuitry is configured to acquire the application control information by accessing the application control information server on a basis of location information of the application control information included in the signaling information.

4. The information processing apparatus according to claim 1, wherein the processing circuitry is configured to:

synthesize the icon on video data of the broadcast program, and output the synthesized video data and icon as the display screen.

5. The information processing apparatus according to claim 1, wherein the processing circuitry is configured to start or stop presenting the Internet-broadcast program related to the broadcast program on a basis of a start time or a stop time preset for the first application.

6. The information processing apparatus according to claim 1, wherein the processing circuitry is configured to start and stop presenting the Internet-broadcast program related to the broadcast program on a basis of a start time and a stop time preset for the first application.

7. The information processing apparatus according to claim 1, wherein the processing circuitry is configured to detect reception of the operation of the icon from a remote controller.

8. The information processing apparatus according to claim 1, wherein the receiving circuitry is configured to receive a data program related to the broadcast program, the data program being provided via the broadcast transmission path, and wherein processing circuitry is configured to switch from presentation of the data program to presentation of the Internet-broadcast program on a basis of the reception of the operation of the icon.

9. The information processing apparatus according to claim 1, wherein the processing circuitry is further configured to determine whether the connection to the network is available.

10. A method for controlling an information processing apparatus, comprising receiving, by a controller via a broadcast transmission path, signaling information including instruction information to acquire application control information related to a first application for presenting an Internet-broadcast program related to a broadcast program provided via the broadcast transmission path;

generating, by the controller, a display screen including an icon by execution of the instruction information on a basis of a determination that the information processing apparatus supports an Internet-related broadcast and a determination that a connection to a network is available, wherein the display screen is generated according to a script included in the instruction information;

acquiring, by the controller, the application control information on a basis of reception of an operation of the icon;

acquiring, by the controller, the first application via the network on a basis of application location information included in the application control information;

executing, by the controller, the first application to present the Internet-broadcast program;

ending the first application, by the controller, on a basis of information indicating a switch to a second application for presenting an Internet-broadcast program different from the Internet-broadcast program of the first application, the second application being different from the first application, and the information indicating the switch to the second application being accompanied by an update of the signaling information while the Internet-broadcast program is being presented by the first application; and acquiring, by the controller, the second application, wherein when the display screen including the icon is displayed and a button for a data broadcast program is operated the icon is deleted from the display screen and the data broadcast program is displayed on the display screen, wherein the icon is synthesized on a TV program that is being displayed on the display screen, wherein when the display screen including the icon is displayed and the button for the data broadcast program is operated, the data broadcast program is displayed on the display screen with the TV program, wherein when the display screen including the icon is displayed and a button corresponding to operation of the icon is operated, the Internet-broadcast program is displayed on the display screen with the TV program, and wherein when a determination is made that the information processing apparatus does not support an Internet-related broadcast or that a connection to the network is not available, the button for the data broadcast program is set to a standby state, and when the button for the data broadcast program is in the standby state and is operated, the information processing apparatus acquires a low-order page document according to a script of the instruction information, generates presentment data for the low-order page document, and displays, according the presentment data, the data broadcast program with the TV program.

11. The method according to claim 10, further comprising acquiring, by the controller, the application control information via the network on a basis of the reception of the operation of the icon.

12. The method according to claim 11, further comprising acquiring the application control information by accessing the application control information server on a basis of location information of the application control information included in the signaling information.

13. The method according to claim 10, further comprising:

synthesizing, by the controller, the icon on video data of the broadcast program; and outputting, by the controller, the synthesized video data and icon as the display screen.

14. The method according to claim 10, further comprising starting or stopping presenting the Internet-broadcast program related to the broadcast program on a basis of a start time or a stop time preset for the application.

15. The method according to claim 10, further comprising starting and stopping presenting the Internet-broadcast program related to the broadcast program on a basis of a start time and a stop time preset for the application.

16. The method according to claim 10, further comprising detecting, by the controller, reception of the operation of the icon from a remote controller.

17. The method according to claim 10, further comprising:

receiving, by the controller, a data program related to the broadcast program, the data program being provided via the broadcast transmission path; and switching, by the controller, from presentation of the data program to presentation of the Internet-broadcast program on a basis of the reception of the operation of the icon.

18. The method according to claim 10, further comprising determining whether the connection to the network is available.

* * * * *